United States Patent
Hashimoto et al.

(10) Patent No.: US 7,332,216 B2
(45) Date of Patent: *Feb. 19, 2008

(54) FILM-REINFORCED GLASSES

(75) Inventors: Masao Hashimoto, Yokohama (JP); Tokuo Okada, Yokohama (JP)

(73) Assignee: Bridgestone Corporation, Tokyo (JP)

(*) Notice: Subject to any disclaimer, the term of this patent is extended or adjusted under 35 U.S.C. 154(b) by 321 days.

This patent is subject to a terminal disclaimer.

(21) Appl. No.: 10/203,944

(22) PCT Filed: Dec. 17, 2001

(86) PCT No.: PCT/JP01/11035

§ 371 (c)(1), (2), (4) Date: Aug. 16, 2002

(87) PCT Pub. No.: WO02/49982

PCT Pub. Date: Jun. 27, 2002

(65) Prior Publication Data

US 2003/0111159 A1 Jun. 19, 2003

(30) Foreign Application Priority Data

Dec. 18, 2000 (JP) .............................. 2000-383929
Dec. 20, 2000 (JP) .............................. 2000-387391
Mar. 9, 2001 (JP) .............................. 2001-066280

(51) Int. Cl. *B32B 17/10* (2006.01)

(52) U.S. Cl. ............... 428/331; 428/332; 428/412; 428/437; 428/442; 428/451; 428/483; 428/501; 428/522

(58) Field of Classification Search ............... 156/99, 156/106; 427/165; 428/331, 332, 437, 442, 428/501, 522, 412

See application file for complete search history.

(56) References Cited

U.S. PATENT DOCUMENTS

| | | | | |
|---|---|---|---|---|
| 4,427,743 A | * | 1/1984 | Katsuki et al. | .......... 428/424.6 |
| 4,865,918 A | | 9/1989 | Tanuma et al. | |
| 4,910,074 A | * | 3/1990 | Fukawa et al. | ............. 428/215 |
| 4,945,002 A | * | 7/1990 | Tanuma et al. | .......... 428/425.6 |
| 5,632,835 A | * | 5/1997 | Niwa et al. | .................... 156/99 |
| 6,132,882 A | * | 10/2000 | Landin et al. | ............... 428/437 |
| 6,379,788 B2 | * | 4/2002 | Choi et al. | .................... 428/333 |
| 6,720,082 B1 | * | 4/2004 | Hashimoto et al. | ......... 428/437 |
| 2002/0058737 A1 | * | 5/2002 | Nishiwaki et al. | .......... 524/431 |

FOREIGN PATENT DOCUMENTS

| | | |
|---|---|---|
| JP | 1-239041 A | 9/1989 |
| JP | 6-99547 A | 4/1994 |
| WO | WO 93/24320 A1 | 12/1993 |
| WO | WO 01/14137 A1 * | 3/2001 |

* cited by examiner

*Primary Examiner*—D. S Nakarani
(74) *Attorney, Agent, or Firm*—Sughrue Mion, PLLC.

(57) ABSTRACT

The present invention provides a film-reinforced glass, which has excellent impact resistance, penetration resistance and durability and which can be easily prepared. The constitution of the glass consists of one glass plate and a film comprising an organic polymer which is superposed thereon through a transparent adhesive layer, wherein the transparent adhesive layer comprises a first transparent adhesive layer of polyvinyl butyral and a second transparent adhesive layer of ethylene-vinyl acetate copolymer; or wherein a hard coat layer consisting of a cured layer formed from a curable resin containing fine particles of silica is provided on the surface of the organic polymer film on the side in noncontact with the transparent adhesive layer.

16 Claims, 2 Drawing Sheets

FILM-REINFORCED GLASSES

This is a National stage entry under 35 U.S.C. § 371 of Application No. PCT/JP01/11035 filed Dec. 17, 2001; the disclosure of which is incorporated herein by reference.

BACKGROUND OF INVENTION

1. Field of the Invention

The present invention relates to a film-reinforced glass which has excellent impact resistance and penetration resistance (resistance to passing through) and is effective in prevention of crimes, and which is used for an automobile, a railway vehicle, a building and a showcase, and a process for the preparation thereof. The invention relates to an adhesive film that can be advantageously utilized for the preparation of the film-reinforced glass. Furthermore, the invention relates to a side window of an automobile comprising the film-reinforced glass.

2. Description of the Related Art

As a glass used in automobile, especially windshield, a laminated glass having a structure that two sheets of glass are bonded through a transparent adhesive layer (intermediate layer) is generally employed. The transparent adhesive layer is, for example, composed of PVB (polyvinyl butyral) layer, and the use of the transparent adhesive layer enhances penetration resistance of the laminated glass. If external impact is given to the laminated glass, the transparent adhesive layer prevents the glass broken by the impact from scattering because the layer adheres to pieces of the broken glass. Even if the laminated glass for automobile is destroyed for the purpose of robbery or invasion, the window of the laminated glass cannot be opened. Hence, the laminated glass is useful as glass for prevention of crimes.

In contrast, a side window (side glass) of automobile such as a door glass and a glass inserted in window is scarcely destroyed due to traffic accident, and therefore the glasses do not need the penetration resistance that the above-mentioned laminated glass has. As a result, for the door glass, a sheet of glass comprising slightly reinforcing glass has been employed. However, in case only such a sheet of glass is used in the door glass, the use brings about the following disadvantages:

(1) the glass is poor in impact resistance and penetration resistance (passing through resistance) compared with the laminated glass;

(2) when the glass is destroyed for the purpose of robbery or invasion, it turns into many pieces of the glass to permit window to open.

Therefore, it is also now under investigation to use a glass having characteristics of the laminated glass for the side window of an automobile (e.g. a door glass and inserted glass).

As the laminated glass, especially the door glass of automobile, JP-A61-155232 describes a safety glass in which a plastic film is superposed on a glass plate through an intermediate film of ethylene-vinyl acetate copolymer (EVA) and further a cured layer is formed on the plastic film.

SUMMARY OF THE INVENTION

As mentioned previously, however, the glass such as door glass generally is used as a sheet of glass, and does not require the thickness and strength that the laminated glass has. Further, the thick laminated glass cannot be occasionally employed for the door glass or inserted glass of a small-sized automobile owing to the thickness.

Hence, the safety glass described in the publication of JP-A61-155232 having three-layered structure of a plastic film, an intermediate film and a glass plate is suitable for the door glass.

In more detail, it is considered that the safety glass has excellent impact resistance and penetration resistance and is effective in prevention of crimes. The safety glass is also desired not only in an automobile, but also in a railway vehicle, a building and a showcase, because a glass plate used in theses applications also needs transparency and further excellent impact resistance and penetration resistance in view of crimes.

According to the study of the inventors, however, though the transparent adhesive layer of PVB has excellent impact resistance and penetration resistance and further good adhesion to a glass, it has poor adhesion to an organic polymer film. In contrast, an adhesive layer of EVA shows good adhesion to both of a glass plate and an organic polymer film, but does not possibly show excellent impact resistance and penetration resistance to sufficiently satisfy the performance as the film-reinforced glass.

Further, the safety glass having the three-layered structure has a disadvantage that a surface of the polymer film is easily scratched to leave a mark compared with a surface of the glass plate. In the publication, the cured film is provided on the polymer film, and however the cured film is an organic polysiloxane film or a polyurethane film having self-restoration function, the former having disadvantages of complicated preparation and high cost and the latter having poor scratch resistance owing to its low hardness.

Hence, the thin safety glass having the three-layered structure and excellent durability is strongly desired.

In view of the above points, the object of the present invention is to provide a film-reinforced glass having a small thickness, which has excellent impact resistance and penetration resistance as well as effective crime prevention, and which can be used as a window glass in an automobile, a railway vehicle and a building.

Further, the object of the present invention is to provide a film-reinforced glass having a small thickness, which has excellent scratch resistance and penetration resistance as well as effective crime prevention, and which can be easily prepared, and a process for the preparation thereof.

Furthermore, the object of the present invention is to provide a film-reinforced glass having a small thickness, which has excellent impact resistance and penetration resistance as well as good adhesion to both of a glass plate and an organic polymer film, and hence shows improved durability and mechanical properties, and an adhesive film advantageously used for the preparation thereof.

Moreover, the object of the present invention is to provide a side window of an automobile having excellent impact resistance and effective crime prevention, and to an automobile provided with the side window.

The present inventors have studied to attain the above objects, and consequently reached the following inventions (a first to sixth inventions).

A first invention of the present invention is provided by a film-reinforced glass comprising one glass plate and a film comprising an organic polymer which is superposed thereon through a transparent adhesive layer, wherein the transparent adhesive layer comprises a first transparent adhesive layer comprising polyvinyl butyral (may be referred to as PVB) and a second transparent adhesive layer comprising ethylene-vinyl acetate copolymer (may be referred to as EVA), the first transparent adhesive layer being provided on the side of the glass plate and the second transparent adhesive layer being provided on the side of the film.

The film-reinforced glass shows excellent durability because the first transparent adhesive layer ensures good adhesion to the glass plate and the second transparent adhesive layer ensures good adhesion to the organic polymer film.

Further EVA has excellent water resistance and therefore the film-reinforced glass has the following advantages: for instance, in case a film-reinforced glass is used in a door glass of automobile, the glass is frequently in contact with a frame of window because the door glass is caused to move up and down, whereby the film is apt to be peeled from the glass. However, the film-reinforced glass of the invention is enhanced in water resistance as mentioned above, and therefore the film is scarcely peeled from the glass.

Moreover, in the film-reinforced glass of the invention, both of the EVA layer and the PVB layer are provided as the transparent adhesive layer. Therefore, even if the film-reinforced glass is destroyed for the purpose of crime, the destroyed pieces are bonded to each other through the adhesive layer to prevent the window from freely opening and shutting. Hence the glass of the invention is useful as a glass for prevention of crimes.

The ethylene-vinyl acetate copolymer of the second transparent adhesive layer is preferably cured by a crosslinker, whereby more excellent adhesion can be obtained. Further the ethylene-vinyl acetate copolymer of the second transparent adhesive layer preferably comprises ethylene-vinyl acetate copolymer cured by triallyl isocyanurate, whereby excellent moisture resistance (water vapor proof) is acquired. The second transparent adhesive layer is preferably formed by a coating method A thickness of the first transparent adhesive layer is preferably in the range of 100 to 1,000 µm, and a thickness of the second transparent adhesive layer is preferably in the range of 5 to 600 µm. A thickness of the second transparent adhesive layer obtained by a coating method is preferably in the range of 2 to 50 µm. The adoption of these ranges brings about enhancement of adhesion to the polymer film and an even thickness of the adhesive layer, and permits the thickness to thin.

The ethylene-vinyl acetate copolymer of the second transparent adhesive layer preferably contains vinyl acetate in an amount of 10 to 50% by weight.

The transparent adhesive layer further contains preferably γ-(methacryloxypropyl)trimethoxysilane to further improve adhesion.

The organic polymer film preferably is a polyethylene terephthalate film or a polycarbonate film to ensure transparency and durability. Moreover, a hard coat layer is preferably provided on the organic polymer film, and the hard coat layer preferably comprises a cured layer formed from a curable resin containing fine particles of silica, which is mentioned later.

A second invention of the present invention is provided by an adhesive film which comprises a first transparent adhesive layer comprising polyvinyl butyral and a second transparent adhesive layer comprising ethylene-vinyl acetate copolymer provided on one side or both sides of the first transparent adhesive layer, the second transparent adhesive layer is formed by a coating method.

As described previously, in case a film-reinforced glass is prepared by using the adhesive film, the adhesion between the glass plate and the organic polymer film is improved. In the adhesion film, the second transparent adhesive layer is formed by a coating method and therefore the adhesive layer is apt to have an even thickness, which is also permitted to thin. The preferred embodiments of the first and second transparent adhesive layers in the first invention can be applied to the first and second transparent adhesive layers in the second invention.

A third invention of the present invention is provided by film-reinforced glass comprising one glass plate and a film comprising an organic polymer which is superposed thereon through a transparent adhesive layer comprising an organic resin, wherein a hard coat layer comprising a cured layer formed from a curable resin containing fine particles of silica is provided on the surface of the organic polymer film on the side in noncontact with the transparent adhesive layer.

In the film-reinforced glass, the curable resin preferably is an ultra-violet curable resin to enhance the productivity. The silica particles preferably have a primary particle size of 1 to 200 nm to enhance the transparency. The silica particles preferably have a polymerizable unsaturated group, and further the silica particles are preferably obtained by reaction between fine silica particles and an alkoxysilane compound having a polymerizable unsaturated group (and preferably urethane bond).

On the hard coat layer, it is preferred to form an antireflection layer. The antireflection layer preferably comprises a high refractive index conductive layer (preferably ITO film) and a low refractive index conductive layer (preferably $SiO_2$ film), or a three layered structure consisting of the organic polymer film, the hard coat layer and the antireflection layer and having light transmittance of 40% or less at wavelength of 365 nm.

The organic resin of the transparent adhesive layer preferably is at least one selected from polyvinyl butyral and ethylene-vinyl acetate copolymer. The transparent adhesive layer preferably comprises ethylene-vinyl acetate copolymer cured by triallyl isocyanurate to enhance the excellent moisture resistance. The transparent adhesive layer further preferably contains γ-(methacryloxypropyl)trimethoxysilane.

The transparent adhesive layer preferably is a two-layered structure, i.e., comprising a first transparent adhesive layer comprising polyvinyl butyral and a second transparent adhesive layer comprising ethylene-vinyl acetate copolymer, the first transparent adhesive layer being provided on the side of the glass plate and the second transparent adhesive layer being provided on the side of the film.

The organic polymer of the organic polymer film preferably is a polyethylene terephthalate (PET) or a polycarbonate.

A forth invention of the present invention is provided by a process for the preparation of a film-reinforced glass comprising:

placing a film comprising an organic polymer on a transparent adhesive layer of a laminate comprising one glass plate and the transparent adhesive layer provided thereon, the transparent adhesive layer comprising an ethylene-vinyl acetate copolymer containing a photopolymerization initiator, subsequently applying a liquid containing a curable resin and fine particles of silica for forming a hard coat layer onto the film and drying a layer of the liquid to form a curable resin layer, pressing and bonding the whole laminate having the curable resin layer in a vacuum, and exposing the curable resin layer to ultra violet rays to cure both of the curable resin layer and the transparent adhesive layer; and placing a film comprising an organic polymer on a transparent adhesive layer of a laminate comprising one glass plate and the transparent adhesive layer provided thereon, the transparent adhesive layer comprising an ethylene-vinyl acetate copolymer containing a photopolymerization initiator, subsequently applying a liquid containing a curable resin and fine particles of silica for forming a hard coat layer onto the film (and drying a layer of the liquid) to form a curable resin layer, placing a release sheet on the curable resin layer, pressing and bonding the whole laminate having the curable resin layer and the release sheet in a vacuum, and exposing the curable resin layer to ultra violet rays to cure both of the curable resin layer and the transparent adhesive layer.

A fifth invention of the present invention is provided by a side window of an automobile comprising the film-reinforced glass as defined above. The film-reinforced glass of the invention has excellent durability and therefore is especially suitable for a side window used in a side (e.g., door) of an automobile.

A sixth invention of the present invention is provided by an automobile provided with the side window comprising the film-reinforced glass as defined above. As the automobile provided with the side window, a known automobile, especially a passenger vehicle can be employed.

DETAILED DESCRIPTION OF THE INVENTION

The present invention is explained in detail as under.

A film-reinforced glass of a first invention according to the invention has a basic structure obtained by laminating a glass plate and a film comprising an organic polymer through a two-layered adhesive layer consisting of a first and a second transparent adhesive layers. Though the film-reinforced glass having the above structure has a relatively small thickness and a light weight, it shows proper performances in properties such as impact resistance and penetration resistance.

Therefore the glass can be preferably used as a window glass in various vehicles such as an automobile and a railway vehicle and building, and as a glass in show-window and showcase. In more detail, it is needed that such a glass prevents easy invasion from outside of the vehicle by destroy to the inside of the vehicle to lead to prevention of crimes, whereas it is also needed that the glass has proper impact resistance and penetration resistance so that it can be destroyed in case of emergency such as traffic accident. Hence, the film-reinforced glass of the invention can be preferably used in the above applications.

Figure 1:
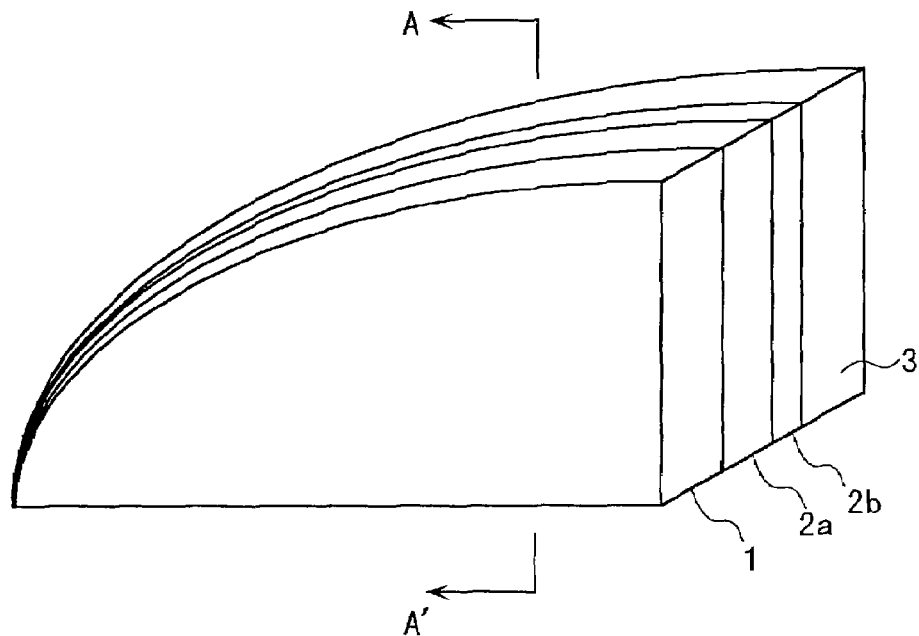
FIG. 1 is a perspective view for explaining an example of a preferred embodiment of the film-reinforced glass of the first invention according to the invention.
Figure 2:
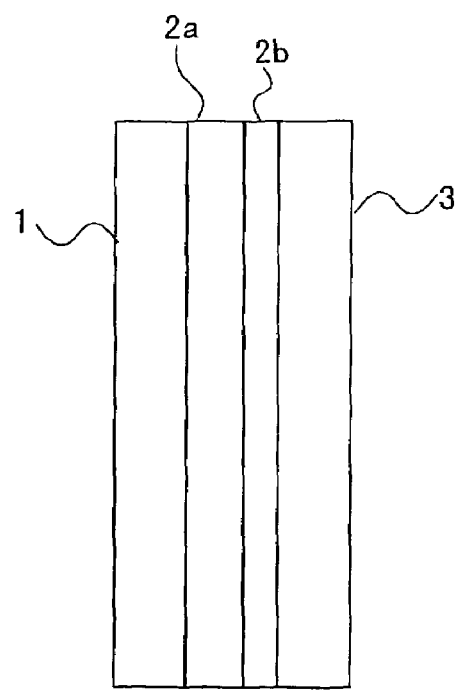
FIG. 2 is a section view taken along a line A-A' in FIG. 1.

Referring to FIG. 1 and FIG. 2, the film-reinforced glass of a first invention according to the invention is described in detail.

In FIG. 1, a film-reinforced glass obtained by laminating a glass plate 1 and a film 3 comprising an organic polymer through a first adhesive layer 2a comprising PVB and a second transparent adhesive layer 2b comprising EVA is shown. The shape of the film-reinforced glass of FIG. 1 is a representative example when used in the door glass of automobile. The first adhesive layer 2a is in contact with the glass plate, while the second transparent adhesive layer 2b contacts the side of the organic polymer layer. Thereby the adhesion between the glass plate and the organic polymer film is greatly enhanced to provide improved durability.

The organic polymer film 3 is provided to effectively prevent the glass plate from breaking down. By using the organic polymer film and adopting the above structure, even the film-reinforced glass using only one glass plate can acquire the above excellent characteristics. Thus, in case the film-reinforced glass is used in a side window (e.g., a door glass or inserted glass) of an automobile (e.g. small-sized car), which is rendered excellent in prevention of crimes.

FIG. 2 shows a section view taken along a line A-A' in FIG. 1 to clarify the construction of the film-reinforced glass.

The glass plate 1 of the invention generally comprises silicate glass. The thickness of the glass plate is varied depending on where the reinforced glass of the invention is used. For example, in case the film-reinforced glass is used as a side window or inserted glass of automobile, the glass plate need not have the thickness of windshield and therefore its thickness is generally in the range of 1 to 10 mm, preferably 3 to 5 mm. The glass plate 1 is tempered in heat or chemical resistance.

The organic polymer film 3 is provided to effectively prevent the glass plate 1 from breaking down. Examples of the organic polymer include polyester, polycarbonate, acrylic resin, and polyamide (e.g., nylon). Preferred is polyester such as PET, polyethylene naphthalate or polyethylene butyrate. Especially preferred is PET. The thickness of the organic polymer film is generally in the range of 0.1 to 2 mm, preferably 0.5 to 1 mm though it varies depending upon the applications.

A hard coat layer can be provided on the organic polymer film 3 to enhance scratch resistance of surface. As a resin for forming the hard coat layer, UV (ultraviolet) curable resin can be generally employed. Further, any low molecular and polyfunctional resins suitable for forming a hard coat layer are usable. Examples of materials for the UV curable resin include oligomers such as urethane oligomer, polyester oligomer and epoxy oligomer which have plural ethylenically double bonds; and mono- or polyfunctional oligomers (monomers) such as pentaerythritol tetraacrylate (PETA), pentaerythritol tetramethacrylate and dipentaerythritol hexaacrylate (DPEHA); and photopolymerization initiators such as benzoin, benzophenone, benzoyl methyl ether, benzoin ethyl ether, benzoin isopropyl ether, benzoin isobutyl ether and dibenzyl. The UV curable resin generally consists of oligomer, photopolymerization and if necessary reactive diluent (monomer), and further various additives can be used. The oligomers, reactive diluents and photoinitiators can be each used singly, or in combination of two or more kinds. The content of the diluent is preferably in an amount of 0.1 to 10 parts by weight, particularly 0.5 to 5 parts by weight based on 100 parts by weight of UV curable resin.

The content of the photoinitiator is preferably in an amount of not more than 5 parts by weight based on 100 parts by weight of UV curable resin.

Although the hard coat layer is generally composed mainly of the above materials, hard coat layers having various excellent functions can be obtained by using further modified oligomers prepared by modifying the above oligomers, or other functional resin or additives. These examples include a high scratch-resistant hard coat layer having further enhanced scratch-resistance, a fog-resistant hard coat layer having fog-resistance, a conductive hard coat layer having conductivity, an antistatic hard coat layer having antistatic properties, a high-gloss hard coat layer having more high gloss, a solvent-resistant hard coat layer especially improved in solvent resistance and a low permeable hard coat layer having low permeability into which moisture scarcely permeates. Depending on the applications, at least two of these hard coat layers are preferably used. Only one layer may be naturally used.

The high scratch-resistant hard coat layer is generally a layer having pencil hardness of not less than 8H, especially not less than 9H. The conventional hard coat layer generally has pencil hardness of not less than 5H. To enhance scratch-resistant, for example, it is necessary to increase the pencil hardness. In this case, the hard coat layer should be prevented from cracking by reduction of the thickness. The high scratch-resistant hard coat layer can be formed by using, for example, trade name UVCH1105 available from Toshiba Silicone Corp.

The fog-resistant hard coat layer is a layer in which dew condensation and induction of transparency do not occur even if the layer is brought into contact with water vapor. To improve fog-resistance, it is necessary to use hydrophilic oligomers and monomers or surfactants (especially wetting agent). The fog-resistant hard coat layer can be formed using, for example, trade name DIABEAM MH-3263 available from Mitsubishi Rayon Co., Ltd.

The conductive hard coat layer is a layer having high conductivity, which generally has electrical conductivity of $10^2$ to $10^4$ s/cm. To add conductivity to the layer to cut electromagnetic wave, it is necessary to incorporate conductive materials such as carbon black and metal (e.g., silver, copper and nickel) particles into the layer. The conductive hard coat layer can be formed by using, for example, trade name CONDUCTIVE EJ-3 available from Dai Nippon Toryo Co., Ltd.

The antistatic hard coat layer is a layer that does not easily generate static electricity by rubbing, which generally has volume resistivity of not more than $10^{12}\Omega\cdot cm$. To improve antistatic properties, it is necessary, for example, to use various surfactants, and/or oligomers and monomers having surfactant group. The antistatic hard coat layer can be formed by using, for example, trade name SUNRAD UXH601 available from Sanyo Chemical Industries, Ltd.

The high-gloss hard coat layer is generally a layer of gloss of not less than 95 (according to JIS K 7105). To enhance gloss, it is necessary, for example, to appropriately combine various oligomers and monomers. The high-gloss hard coat layer can be formed using, for example, trade name ADEKA OPTMER KR-567 available from Asahi Denka Kogyo K.K.

Although the hard coat layer is excellent in solvent resistance per se, the solvent-resistant hard coat layer is a layer having excellent resistance to high polar solvent (e.g., DMF). To improve solvent resistance, it is necessary, for example, to use silicon- or fluorine-modified oligomers, monomers or resin. The hard coat layer improved in solvent resistance can be formed by using, for example, trade name Silicone Hard Coat Agent KP851 available from Shin-Etsu Chemical Co., Ltd.

The hard coat layer having low permeability is a layer into which moisture scarcely permeates, and generally has permeability of not more than 0.5 $g/m^2 \cdot 24$ h (according to JIS Z 0208). To allow moisture to scarcely permeate into the layer, it is necessary, for example, to use silicon- or fluorine-modified oligomers, monomers or resin. The low permeable hard coat layer can be formed by using, for example, trade name Ultraviolet Curing Resin having Low Permeability available from Nippon Kasei Co., Ltd.

The thickness of the hard coat layer is generally in the range of 0.1 to 20 μm, preferably 1 to 15 μm. The range can be applied to a thickness of a single layer and a total thickness of plural layers.

Otherwise, instead of the above mentioned hard coat layer, the silica-containing hard coat layer as mentioned later is preferably formed.

PVB used in the first transparent adhesive layer 2a has preferably 70 to 95 weight % of vinyl acetal unit and 1 to 15 weight % of vinyl acetal unit, and average polymerization degree of 200 to 3,000 (especially 300 to 2,500). The PVB is generally used as a resin composition containing plasticizer.

Examples of the plasticizer include organic plasticizers such as monobasic acid ester and polybasic acid ester; and plasticizers derived from phosphoric acid.

Examples of the monobasic acid ester preferably include esters obtained by reacting organic acids (e.g., butyric acid, isobutyric acid, caproic acid, 2-ethylbutyric acid, heptanoic acid, n-octyric acid, 2-ethylhexanoic acid, pelargonic acid (n-nonylic acid)) with triethylene glycol; especially triethylene-di-2-ethyl butyrate, triethylene glycol-di-2-ethyl hexoate (hexonic ester), triethylene glycol-di-capronate, triethylene glycol-di-n-ochotoate. Further, esters of one of the above-mentioned organic acids and tetraethylene glycol or tripropylene glycol can be used.

Examples of the polybasic acid ester plasticizers preferably include esters obtained by reacting organic acids (e.g., adipic acid, sebacic acid and azelaic acid) with linear or branched alcohol having 4 to 8 carbon atoms, especially dibutyl sebacate, dioctyl azelate, dibutylcarbitol adipate.

Examples of the phosphoric acid plasticizers include tributoxyethyl phosphate, isodecylphenyl phosphate, triisopropyl phosphate.

In the PVB resin composition, an insufficient amount of plasticizer deteriorates film-forming property, while excess of plasticizer lowers durability under high temperature. Hence, the plasticizer can be used in the range of 5 to 50 parts by weight, especially 10 to 40 parts by weight based on 100 parts by weight of PVB.

The PVB resin composition can further contain stabilizer, antioxidant and UV absorber.

In EVA used in the second transparent adhesive layer 2b, the content of vinyl acetate preferably is in the range of 10 to 50% by weight, especially 15 to 40% by weight. When the content is less than 10% by weight, the resin cured at high temperature does not show satisfactory transparency. On the other hand, when the content is more than 50% by weight, the resin is apt not to satisfy impact resistance and penetration resistance required in the glass for prevention of crimes.

An EVA resin composition used in the second transparent adhesive layer 2b can contain various additives such as a plasticizer, organic peroxide as a crosslinker and an adhesion promoter.

As the plasticizer, polybasic acid esters and polyhydric alcohol esters are generally employed although the plasticizer can be used without any restriction. Examples of the esters include dioctyl phthalate, dihexyladipate, triethylene glycol-di-2-ethylbutylate, butyl sebacate, tetraethylene glycol heptanoate and triethylene glycol dipelargonate. The plasticizer can be used singly, or in combination of two or more kinds. The content of the plasticizer is generally in an amount of not more than 5 parts by weight based on 100 parts by weight of EVA.

As the organic peroxide, any materials that can be decomposed at a temperature of not less than 100° C. to generate radical(s) can be employed. The organic peroxide is selected in the consideration of film-forming temperature, condition for preparing the composition, curing (bonding) temperature, heat resistance of body to be bonded, storage stability. Especially, preferred are those having a decomposition temperature of not less than 70° C. in a half-life of 10 hours.

Examples of the organic peroxide include 2,5-dimethylhexane-2,5-dihydroperoxide, 2,5-dimethyl-2,5-(t-butylperoxy)hexane-3-di-t-butylperoxide, t-butylcumyl peroxide, 2,5-dimethyl-2,5-di(t-butylperoxy)hexane, dicumyl peroxide, α,α'-bis(t-butylperoxyisopropyl)benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethyl-2,5-bis(t-butylperoxy)-3,3,5-trimethylcyclohexane, 1,1-bis(t-butylperosy)cyclohexane, 2,5-dimethylhexyl-2,5-bisperoxybenzoate, t-butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, t-butylperoxyisobutylate and 2,4-dichlorobenzoyl peroxide. The organic peroxide can be used singly, or in combination of two or more kinds. The content of the organic peroxide is preferably in an amount of 0.1 to 5 parts by weight based on 100 parts by weight of EVA.

By adding the organic peroxide to the EVA resin composition, the heat-curing characteristics of the composition is improved, and consequently the film-strength of the second adhesive layer 2b is enhanced.

In case EVA is cured by light, photosensitizer (photopolymerization initiator) is used instead of the organic peroxide, and it is generally used in an amount of not more than 5 parts by weigh, preferably 0.1 to 5 parts by weight based on 100 parts by weight of EVA.

Examples of the photopolymerization initiator include benzoin, benzophenone, benzoyl methyl ether, benzoin ethyl ether, benzoin isopropyl ether, benzoin isobutyl ether, dibenzyl, 5-nitroacenaphtene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone. The photopolymerization initiators can be used singly, or in combination of two or more kinds.

In the invention, a silane coupling agent can be used for enhancing the adhesive strength. Examples of the silane coupling agent include γ-chloropropylmethoxysilane, vinyltriethoxysilane, vinyltris(β-methoxyethoxy)silane, γ-methacryloxypropylmethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane. The silane coupling agents can be used singly, or in combination of two or more kinds. The content of the silane coupling agent is preferably in an amount of not more than 5 weight by part based on 100 parts by weight of EVA.

The EVA resin composition constituting the second transparent adhesive layer 2b preferably contains acryloxy group-containing compounds, methacryloxy group-containing compounds and/or epoxy group-containing compounds for improvement or adjustment of various properties of layer (e.g., mechanical strength, adhesive property (adhesion), optical characteristics such as transparency, heat resistance, light-resistance, crosslinking rate), particularly for improvement mechanical strength.

Examples of the acryloxy and methacryloxy group containing compounds include generally derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, 3-chloro-2-hydroxypropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol.

Example of the amide includes diacetone acrylamide.

Examples of polyfunctional compounds (crosslinking auxiliaries) include esters of plural acrylic acids or methacrylic acids with polyhydric alcohol such as glycerol, trimethylol propane or pentaerythritol; and further triallyl cyanurate and triallyl isocyanurate.

Examples of the epoxy group containing compounds include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)$_5$glycidyl ether, p-tert-butylphenyl glycidyl ether, diglycidyl adipate, diglycidyl phthalate, glycidyl methacrylate and butyl glycidyl ether.

The acryloxy group-containing compounds, methacryloxy group-containing compounds and/or epoxy group-containing compounds are generally used in an amount of not more than 5 parts by weigh based on 100 parts by weight of EVA.

The organic resin of the second transparent adhesive layer preferably is the ethylene vinyl acetate copolymer crosslinked by triallyl isocyanurate, i.e., triallyl isocyanurate-crosslinked EVA (may be referred to as EVAT). The EVAT can be obtained by adding a small amount of triallyl isocyanurate to EVA and crosslinking the EVA with the triallyl isocyanurate. The EVA may be used together with polyvinyl acetal resin (e.g., polyvinyl formal, polyvinyl butyral (PVB), modified PVB), and/or polyvinyl chloride, if necessary. The content of the triallyl isocyanurate is generally in the range of 0.1 to 20 parts by weigh, preferably 0.5 to 10 parts by weigh, especially 0.5 to 5 parts by weigh based on 100 parts by weight of EVA. The use of the triallyl isocyanurate of less than the lowest limit reduces the transparency and adhesion, while the use of more than the highest limit reduces the elongation.

In the film-reinforced glass 1 of the invention, when the first transparent adhesive layer 2a of PVB has an excessive small thickness, the obtained film-reinforced glass does not show sufficient impact absorbing properties and excellent penetration resistance. In contrast, when the first transparent adhesive layer 2a of PVB has an excessive large thickness, the large thickness obstructs reduction of the thickness of the obtained film-reinforced glass and decreases the transparency. Thus the thickness of the first transparent adhesive layer generally is in the range of 25 to 250 μm, preferably 25 to 100 μm.

Further, when the second transparent adhesive layer 2b of EVA has an excessive small thickness, the obtained film-reinforced glass does not show sufficient adhesion. In contrast, when the second transparent adhesive layer has an excessive large thickness, the large thickness obstructs reduction of the thickness of the obtained film-reinforced glass and decreases the transparency. Thus the thickness of the second transparent adhesive layer generally is in the range of 5 to 600 μm, preferably 5 to 200 μm. However, in case the layer is formed by coating (application), a thin layer can be formed with an even thickness. Thus even the coated second transparent adhesive layer in the range of 3 to 50 μm shows sufficient characteristics.

The film-reinforced glass can be prepared by a process comprising preparing a PVB film for the first transparent adhesive layer 2a and an EVA film for the second transparent adhesive layer 2b, superposing on a glass plate, the PVB film, the EVA film and an organic polymer film 3 in this order to form a laminate, degassing the laminate, and pressing the laminate under heating to bond and integrate it. Further, in case a hard coat layer is formed on the organic polymer film 3, after the bonding of the laminate, the hard coat layer can be formed on the surface of the film of the laminate.

The PVB film and the EVA film can be obtained using each of the above resin compositions by a conventional process for preparing sheet by, for example, extrusion molding or calendaring molding. Otherwise, the film can be prepared by dissolving the resin composition in a solvent to give a solution, coating the liquid onto an appropriate support by a coater, and drying the coated solution to form a coated film in the form of sheet.

Though the PVB layer and the EVA layer are prepared by forming each of the resin films as above, further the PVB layer and the EVA layer can be also prepared by simultaneously extruding the PVB and EVA resins in the form of two layers to form a composite film of the PVB and the EVA layers (two-coat simultaneous extrusion). Otherwise, a liquid of one of the resin compositions cane be applied onto a film of the other of the resin compositions, for example a liquid of EVA resin compositions is applied onto a film molded from the PVB resin composition to a two-layered film. By using the above composite film, it is also possible to form a laminate together with the glass plate and organic polymer film as mentioned above, and to bond and integrate the laminate.

The second invention according to the present invention is an adhesive film which comprises a first transparent adhesive layer (PVB film) comprising polyvinyl butyral and a second transparent adhesive layer comprising ethylene-vinyl acetate copolymer formed on one side or both sides of the first transparent adhesive layer by a coating, which corresponds to the above two-layered film (composite film).

The third invention according to the present invention is a film-reinforced glass comprising one glass plate and a film comprising an organic polymer which is superposed thereon through a transparent adhesive layer comprising an organic resin (preferably ethylene-vinyl acetate copolymer (EVA) or polyvinyl acetal resin), wherein a hard coat layer comprising a cured layer formed from a curable resin (generally UV curable resin) containing fine particles of silica is provided on the surface of the organic polymer film on the side in noncontact with the transparent adhesive layer. This film-reinforced glass is especially excellent in scratch resistance and prevention of crimes. The above first and second adhesive layers can be used in the transparent adhesive layer of the third invention.

Though the film-reinforced glass is easily prepared due to the above structure, the glass has excellent scratch resistance and further proper performance in impact resistance and penetration resistance. Therefore the glass can be preferably used as a window glass in various vehicles such as an automobile and a railway vehicle and building, and as a glass in show-window and showcase. In more detail, it is needed that such a film-reinforced prevents from invasion from outside of the vehicle to the inside by destroy to lead to prevention of crimes, whereas it is also required that the glass has such proper impact resistance and penetration resistance that the glass can be destroyed in case of emergency such as traffic accident. Hence, the film-reinforced glass of the invention can be preferably used in the above applications.

Figure 3:
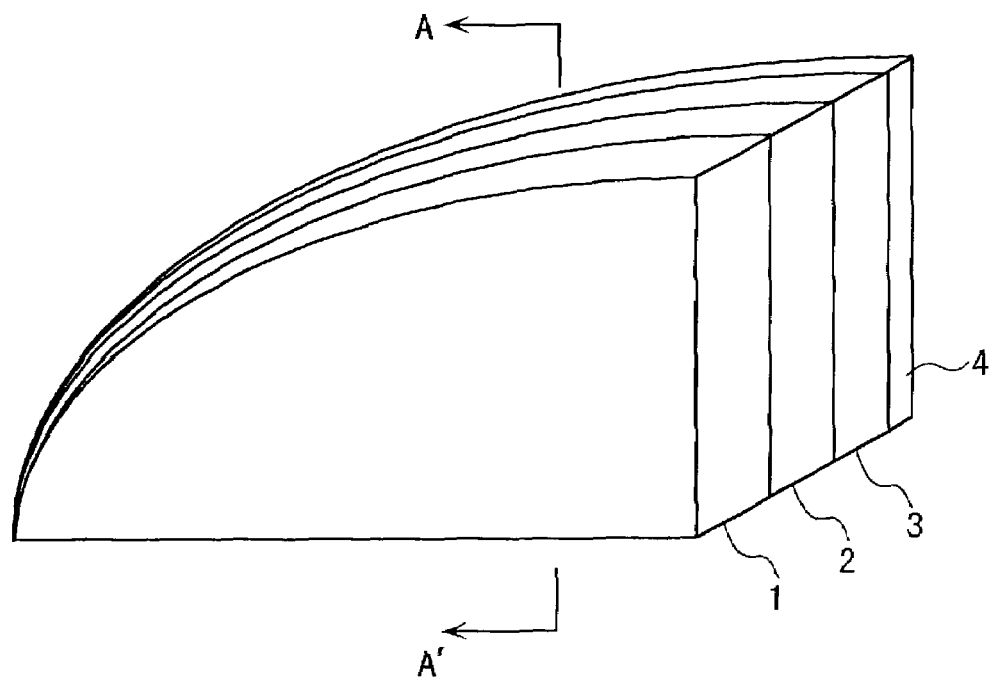
FIG. 3 is a perspective view for explaining an example of a preferred embodiment of the film-reinforced glass of the third invention according to the invention.
Figure 4:
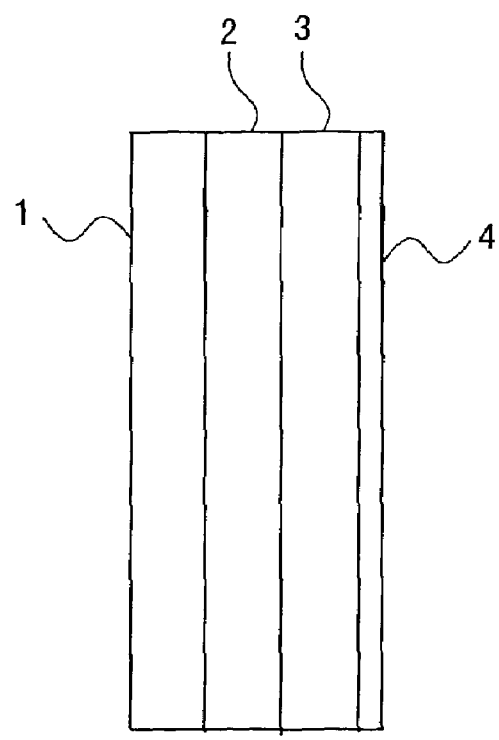
FIG. 4 is a section view taken along a line A-A' in FIG. 3.

Referring to FIG. 3 and FIG. 4, the film-reinforced glass of the third invention according to the invention is described in detail below.

In FIG. 3, on a glass plate 1, a transparent adhesive layer 2 and a film 3 comprising an organic polymer are superposed, and further a hard coat layer 4 containing fine particles of silica is provided on the organic polymer film 3. The shape of the film-reinforced glass in FIG. 3 is a representative one of examples of side windows or side glasses used in an automobile. The transparent adhesive layer 2 is preferably made up of a resin composition mainly consisting of EVA in view of improvement of water resistance and durability though EVA does not show sufficiently excellent transparency. The transparent adhesive layer 2 has also good adhesion to the organic polymer film 3. On the surface of the organic polymer film 3, the hard coat layer 4 containing fine particles of silica is formed, whereby the scratch resistance is improved. A surface of side window corresponding to the hard coat layer faces on the inside of an automobile, and therefore the surface is apt to contact a person or to be hit by a thing to generate scratch. To prevent the generation of scratch, the hard coat layer is provided. On the other hand, the glass plate is exposed to the outside, and hence it is not needed that the prevention of the generation of scratch is taken in consideration. The hard coat layer of the invention can be easily formed, and has high hardness near to that of glass and transparency.

Further, the organic polymer film 3 is provided to prevent destruction of the glass. Therefore, by using the organic polymer film and adopting the above structure, the film-reinforced glass has the above-mentioned excellent performances in spite of the use of one glass plate, and hence the glass can be employed as a film-reinforced glass having excellent prevention of crimes which are used in a side window or inserted glass of an automobile (e.g., small-sized vehicle).

Further, an antireflection layer is preferably provided on the hard coat layer of the invention, whereby a person can watch an outer scene without dazzle when the person looks at the scene from the window of automobile. Furthermore the hard coat layer containing fine particles of silica according to the invention has good adhesion to the antireflection layer to enhance durability of the film-reinforced glass provided with the antireflection layer.

Since the side window of automobile shown in FIG. 3 is used as a door glass of automobile, the window is exposed to the severe conditions of opening and shutting of window. Occurrence of scratch can be prevented by the provision of the hard coat layer, but whitening or peeling at the end of the glass is apt to arise. In more detail, the side window has a transparent adhesive layer exposed at the end of the side of the glass, and the exposed portion is not sufficiently satisfied in moisture resistance whereby the whitening or the reduction of adhesion occurs. To prevent this occurrence, it is preferred that the moisture resistance of the transparent adhesive layer is greatly improved by using ethylene-vinyl acetate copolymer cured by triallyl isocyanurate as the organic resin of the transparent adhesive layer. Even if the cured ethylene-vinyl acetate copolymer is used in the door glass exposed to the severe conditions of opening and shutting of window, the door glass can be used for a long-term period because the whitening or the reduction of adhesion does not occur at the end of the side of the glass. Further, in the side window, the hard coat layer is provided on the organic polymer film and hence the adhesion between the glass plate and the organic polymer film is occasionally reduced because of curing shrinkage on formation of the hard coat layer. However, since the transparent adhesive layer is formed by using ethylene-vinyl acetate copolymer cured by triallyl isocyanurate as the organic resin of the transparent adhesive layer to be greatly improved in the adhesion, it is considered that the use of the side window as the door glass exposed to the severe conditions of opening and shutting of window brings about no peeling of the film to permit the door glass to use for a long-term period.

FIG. 4 shows a section view taken along a line A-A' in FIG. 3 to clarify the construction of FIG. 3. The transparent adhesive layer 2 provided between the one glass plate 1 and the organic polymer film 3 is reduced in impact resistance when its thickness is thin, whereas the transparent adhesive layer 2 is reduced in transparency when its thickness is thick. Thus the thickness of transparent adhesive layer 2 is set in consideration of the above characteristics and where the glass is used. For example, in case the film-reinforced glass is used as a side window or inserted glass, the transparent adhesive layer need not to have the thickness of windshield and therefore its thickness is generally in the range of 0.1 to 10 mm, preferably 0.3 to 3 mm. Similarly, the thickness of the organic polymer film is generally in the range of 0.1 to 2 mm, preferably 0.5 to 1 mm. The thickness of the transparent adhesive layer 2 and the film 3 can be altered depending on where the glass is used.

The preparation of the film-reinforced glass is carried out by placing on a surface of the one glass plate 1 the transparent adhesive layer 2 in the same form as the glass, further superposing the organic polymer film 3 in the same form as the glass on the transparent adhesive layer 2, and pressing and bonding them. The pressing and bonding is generally conducted using a roll under heating. The pressing and bonding may be conducted using an adhesive. Subsequently, the hard coat layer is formed on a surface of the organic polymer film 3. Otherwise, the hard coat layer can be beforehand formed on the organic polymer film 3, and a laminate of the transparent adhesive layer 2 and the organic polymer film 3 can be superposed in order on the surface of the one glass plate 1 and these can be pressed and bonded.

In case the transparent adhesive layer comprises EVA containing a photopolymerization initiator, the following easy method can be adopted. On a surface of the one glass plate 1, the transparent adhesive layer 2 of EVA containing a photopolymerization initiator in the same form as the glass is placed, further the organic polymer film 3 in the same form as the glass is superposed on the transparent adhesive layer 2, and a liquid containing a curable resin and fine particles of silica for forming the hard coat layer is applied onto the film, and drying a layer of the liquid or placing a release sheet on the curable resin layer, and subsequently the resultant laminate is preliminarily degassed in a vacuum to be pressed and bonded, and then the curable resin layer or the release sheet is exposed to ultraviolet rays to cure both of the curable resin layer and the transparent adhesive layer (forth invention). As a result, a laminate in which four or five layers are firmly pressed and bonded can be obtained whereby the film-reinforced glass can be prepared.

The release sheet can be placed on a dried curable resin layer. It is especially preferred that the release sheet is placed on the surface of the curable resin layer when the surface is tacky.

As described above, both of the curable resin layer and the transparent adhesive layer are exposed to ultraviolet rays because both contain a photopolymerization initiator whereby both can be simultaneously cured (crosslinked). Hence, a procedure curing the transparent adhesive layer can be omitted.

As materials of the glass plate 1, the same materials as those described in the first invention can be used.

As the organic resin of the transparent adhesive layer 2 of the invention, any resins can be employed. Preferred examples of the resins include EVA, polyvinyl acetal resins such as polyvinyl formal, polyvinyl butyral (PVB, modified PVB), polyvinyl chloride. Especially preferred are EVA and PVB.

As materials of the EVA and PVB, the same materials as those described in the first invention can be used.

In the third invention, the transparent adhesive layer 2 comprising the organic resin can be prepared by, for example, processes for preparing a sheet such as extrusion molding and calendaring. Otherwise, a liquid obtained by dissolving the organic resin in a solvent is applied onto an appropriate support by an appropriate coater, and dried to form a layer of the organic resin, and consequently a sheet of the organic resin is obtained. As the transparent adhesive layer, the two-layered transparent adhesive layer in the first invention can be preferably used.

As materials of the organic polymer film, the same materials as those described in the first invention can be used.

The hard coat layer 4 of the third invention comprises a cured layer formed from a curable resin (generally UV curable resin) containing fine particles of silica. Particularly, by using the UV curable resin, a hard coat layer having excellent scratch resistance can be easily formed on the surface of the organic polymer film.

The fine particles of silica preferably have a primary diameter of 1 to 200 nm. The silica particles preferably have a polymerizable unsaturated group (generally polymerizable double bond group), and especially silica particles obtained by reaction between silica particles and an alkoxy silane compound having a polymerizable unsaturated group (and preferably further urethane bond).

The fine particles of silica include silica powders or colloidal silica. The primary diameter of the fine particles of silica preferably is in the range of 1 to 200 nm (mµ), especially in the range of 10 to 50 nm. The shape of the silica particles includes sphere, hollow, porous form, bar, plate, fiber or amorphous form, preferably sphere. Specific surface of the silica particles is generally in the range of 0.1 to 3,000 $m^2/g$, preferably in the range of 10 to 1,500 $m^2/g$. The silica particles can be employed in the form of dried powder or in a dispersion of the particles in water or a solvent. The colloidal silica (silica powder dispersion) can be used as it is. It is preferred that the colloidal silica is used to obtain a high transparency. In case a dispersing solvent of the colloidal silica is water, acidic colloidal silica whose hydrogen ion concentration is generally in the range of pH2 to pH 10, preferably pH 3 to pH7 is employed. In case a dispersing solvent of the colloidal silica is an organic solvent, the solvent generally includes methanol, isopropyl alcohol, ethylene glycol, butanol, ethylene glycol monopropyl ether, methyl ethyl ketone, methyl isobutyl ketone, toluene, xylene, dimethyl formamide and a mixture of the solvent and other organic solvent compatible with the solvent or a mixture of the solvent and water. Preferred are methanol, isopropyl alcohol, methyl ethyl ketone and xylene. Examples of trade names of colloidal silica of the fine silica particles, which are commercially available, include Methanol Silicasol, IPA-ST, MEK-ST, NBA-ST, XBA-ST, DMAC-ST and ST-UP, ST-OUP, ST-20, ST-40, ST-C, ST-N, ST-O, ST-50, ST-OL, which are available from Nissan Chemical Industries, Ltd. Examples of trade names of silica powders of the fine silica particles include Aerosil 130, Aerosil 300, Aerosil 380, Aerosil TT600 and Aerosil X50, which are available from Nippon Aerosil Co., Ltd., and Sildex H31, Sildex H32, Sildex H51, Sildex H52, Sildex H121 and Sildex H122, which are available from Asahi Glass Co., Ltd., E220 and E220, which are available from Nippon Silica Co., Ltd., Silisia 470 which is available from Fuji Silisia Co., Ltd., and SG Flake which is available from Nippon Sheet Glass Co., Ltd.

As described previously, the fine particles of silica contained in the curable resin (preferably UV curable resin) for forming the hard coat layer of the invention are preferably obtained by reaction between fine silica particles and an alkoxysilane compound having a polymerizable unsaturated group (and preferably further urethane bond), and are hereinafter referred to as modified fine silica particles and preferably have the following compositions.

The above modified fine silica particles of the invention preferably are those obtained by reaction between fine silica particles and an alkoxysilane compound having a polymerizable unsaturated group, urethane bond and an organic group of formula (I): —X—(C=Y)—NH— wherein X represents —NH—, —O— or —S—, and Y represents an oxygen atom or a sulfur atom, provided that Y is sulfur when X is —O—.

The modified fine silica particles are prepared by a process at least comprising at least a procedure of mixing the fine silica particles and the alkoxysilane compound. The content of the residue of the alkoxysilane compound fixed on the fine silica particles generally is not less than 0.01% by weight, preferably not less than 0.1% by weight, especially not less than 1% by weight. When the content of the residue of the alkoxysilane compound fixed on the fine silica particles generally is less than 0.01% by weight, the silica particles or colloidal silica particles-containing layer (hard coat layer) do not show sufficient dispersing property, transparency and scratch resistance. Further, the proportion of the alkoxysilane compound contained in a composition during the preparation preferably is not less than 10% by weight, especially not less than 30% by weight. When the proportion of the alkoxysilane compound is less than 10% by weight, the UV curable resin does not occasionally show good film-forming property. The UV curable resin contains the modified fine silica particles in the amount of not more than 50% by weight, especially 20% by weight. When the modified fine silica particles are not more than 50% by weight, the liquid of UV curable resin or the hard coat layer does not show sufficiently excellent dispersing property, transparency and scratch resistance.

The alkoxysilane compound generally has at least one polymerizable unsaturated group, at least one urethane bond and at least one organic group of the formula (I) and further at least one alkoxysilyl group. The alkoxysilyl group is hydrolyzed and condensed to combine with a silanol group on the surface of the silica particle. The polymerizable unsaturated group is addition-polymerized by an active radical to crosslink between molecules. The above divalent organic group of formula (I) —X—(C=Y)—NH— and the urethane bond is a constituent unit for combining a molecular piece having the alkoxysilyl group with the a molecular piece having the polymerizable unsaturated group directly or through other molecular piece, and further generate a proper cohesion by hydrogen bond between molecules, whereby excellent mechanical characteristics, adhesion and heat resistance are brought about the hard coat layer of the invention. The —X—(C=Y)—NH— preferably is —S(C=O)NH— group.

The alkoxysilane compound has, for example, the following structure of formula (II):

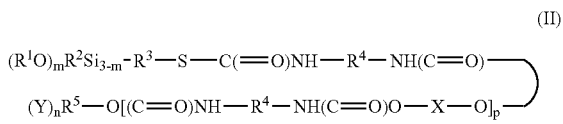

(II)

In the formula (II), $R^1$ represents a hydrogen atom, or a monovalent $C_1$-$C_8$ organic group such as methyl, ethyl, propyl, butyl, phenyl or octyl, $R^2$ represents a hydrogen atom, or a monovalent $C_1$-$C_3$ alkyl group, and m represents 1, 2 or 3. Examples of alkoxysilyl group of $(R^1O)_m R^2 Si_{3-m}$ include trimethoxysilyl, triethoxysilyl, triphenoxysilyl, methyldimethoxysilyl, and dimethylmethoxysilyl. Preferred are trimethoxysilyl and triethoxysilyl.

In the formula (II), a structure unit of —[(C=O)NH—$R^4$—NH—(C=O)O—X—O]$_p$— is introduced to extend a molecular chain of the structure of the formula (II). $R^3$ is a divalent $C_1$-$C_3$ organic group, and $R^4$ is a divalent organic group and may be the same as or different from the group of $R^3$, and has generally a molecular weight of 14 to 10,000, preferably 78 to 1,000. Examples of $R^4$ include polyalkylene chains such as methylene, ethylene, propylene, hexamethylene, octamethylene and dodecamethylene; divalent aliphatic cyclic or polycyclic groups such as cyclohexylene and norbonynene; divalent aromatic groups such as vinylene, phenylene, napthtylene, biphenylene and polyphenylene. Further these divalent groups substituted by an alkyl group or aryl group can be employed. These divalent groups may contain an atomic group consisting of other atoms other than carbon and hydrogen. In the formula (II), p is 0 or 1, X is a divalent organic group, preferably a divalent organic group derived from a compound having in its molecular at least two hydrogen atoms capable of reacting with an isocyanate group through addition reaction, which includes divalent organic groups derived from, for example, polyalkylene glycols, polyalkylene thioglycols, polyesters, polyamides, polycarbonates, polyalkylene diamines, polyalkylene dicarboxylates, polyalkylene diols and polyalkylene dimercaptans by subtracting two hydrogen atoms from these compounds. $R^5$ is a (n+1) valent organic group, preferably linear, branched or cyclic saturated hydrocarbon or unsaturated hydrocarbon. Further n is preferably positive integer of 1 to 20, more preferably 1 to 10, especially 3 to 5. Y in the formula is an organic group having a polymerizable unsaturated group in its molecule which reacts with other molecule to crosslink between molecules in the presence of active radicals. Examples of Y include acryloxy, methacryloxy, vinyl, propenyl, butadienyl, styryl, ethynyl, cinnamoyl, a maleate group and an acrylamide group. Preferred is acryloxy.

The molecular structure of the alkoxysilane can be generally formed by addition-reacting alkoxysilane having a mercapto group (i.e., mercaptoalkoxysilane) with a polyisocyanate compound and polymerizable unsaturated compound having active hydrogen capable of addition reaction with an isocyanate group.

The process for the preparation of the alkoxysilane compound is, for example, carried out by:

a process (A) comprising reacting mercaptoalkoxysilane with a polyisocyanate compound to form an intermediate having an alkoxysilyl group, —S(C=O)NH— group and an isocyanate group, and subsequently reacting the remaining isocyanate in the intermediate with a polymerizable unsaturated compound having active hydrogen to combine them through urethane bond;

a process (B) comprising reacting a polyisocyanate compound with a polymerizable unsaturated compound having active hydrogen to form an intermediate having a polymerizable unsaturated group, urethane group and isocyanate group, and then reacting the intermediate with mercaptoalkoxysilane to combine them through urethane bond. In the processes (A) and (B), a linear, branched or cyclic compound (as a chain extending unit) having two or more active hydrogen atoms capable of addition-reacting with isocyanate can be further reacted with the polyisocyanate compound to extend the chain of the compound through urethane bond.

The alkoxysilane capable of forming —S(C=O)NH— bond by direct reaction with a polyisocyanate compound in the preparation of the compound of the formula (II), can be selected from compounds having one or more alkoxysilyl and one or more mercapto in the molecule. Examples of the compounds include mercaptoalkhoxysilanes such as mercaptopropyltrimethoxysilane, mercaptopropyltriethoxysilane, mercaptopropylmethyldiethoxysilane, mercaptopropyldimethokymethylsilane, mercaptopropylmethoxydimethylsilane, mercaptopropyltriphenoxysilane and mercaptopropyltributhoxysilane. Preferred are mercaptopropyltrimethoxysilane and mercaptopropyltriethoxysilane. Examples of trade names of the mercaptoalkoxysilane, which are commercially available, include SH6062 available from Toray Dow Corning, etc. These mercaptoalkhoxysilanes can be used singly or in or in combination of two or more kinds. Further, examples of the mercaptoalkoxysilanes include adducts of amino-substituted alkoxysilane and epoxy-substituted mercaptan, and adducts of epoxysilane and α,ω-dimercapto compound. As the polyisocyanate compounds used in the preparation of the alkoxysilane, polyisocyanates compounds having the structure of chain saturated hydrocarbon, cyclic saturated hydrocarbon or aromatic hydrocarbon. The polyisocyanate compounds can be used singly or in combination of two or more kinds. The number of isocyanate group in one molecular of the compound generally is in the range of 2 to 30, preferably 2 to 10. When the number is more than 30, the resultant product has high viscosity to reduce workability.

Examples of the polyisocyanate compounds include chain hydrocarbon polyisocyanate compounds such as tetramethylene diisocyanate, hexamethylene diisocyanate and 2,2,4-trimethylhexamethylene diisocyanate; cyclic saturated hydrocarbon polyisocyanate compounds such as isophorone diisocyanate, dicyclohexylmethane diisocyanate, methylene bis(4-cyclohexylisocyanate), hydrogenated diphenylmethane diisocyanate, hydrogenated xylene diisocyanate, hydrogenated toluene diisocyanate and 1,3-bis(isocyanatomethyl)cyclohexane; aromatic hydrocarbon polyisocyanate compounds such as 2,4-tolylene diisocyanate, 2,6-tolylene diisocyanate, 1,3-xylylene diisocyanate, 1,4-xylylene diisocyanate, p-phenylene diisocyanate, 3,3'-dimethyl-4,4'-diphenylmethane diisocyanate, diphenylmethane-4,4'-diisocyanate, 4,4'-biphenylene diisocyanate, 6-isopropyl-1,3-phenyldiisocyanate, 4-diphenylpropane diisocyanate, lysine diisocyanate, 1,5-naphthalene diisocyanate and polyisocyanate of polydiphenylmethane. The polyisocyanate compounds preferably are the cyclic saturated hydrocarbon polyisocyanate compounds and the aromatic hydrocarbon polyisocyanate compounds, especially are the cyclic saturated hydrocarbon polyisocyanate compounds. Preferred examples include isophorone diisocyanate, hydrogenated xylene diisocyanate and hydrogenated toluene diisocyanate. Examples of trade names of the polyisocyanate compounds, which are commercially available, include TDI-80/20, TDI-100, MDI-CR100, MDI-CR300, MDI-PH and NDI which are available from Mitsui Nisso Urethane Co., Ltd.; Coronate T, Milionate Mont., Milionate MR and HDI which are available from Nippon Polyurethane Industries Co., Ltd.; Takenate 600 which is available from Takeda Chemical Industries Co., Ltd.

The polyisocyanate compound is used in the amount corresponding to generally 0.1 to 100, preferably 0.5 to 10, especially 0.9 to 1.2 equivalent of isocyanate based on one equivalent of mercapto group of the mercaptoalkoxy silane, in the above-mentioned process (A). When the equivalent of polyisocyanate is less than 0.1 equivalent, unreacted mercapto silane remains in the amount of 0.9 or more equivalent not to occasionally bring about sufficient wear resistance of the resultant film. When the equivalent of polyisocyanate is more than 100 equivalent, unreacted isocyanate group remains in excessive to occasionally reduce weathering resistance.

In the above-mentioned process (B), the polyisocyanate compound is used in the amount corresponding to generally 0.1 to 100, preferably 0.5 to 10, especially 0.9 to 1.2 equivalent of isocyanate based on one equivalent of active hydrogen of the polymerizable unsaturated compound having active hydrogen.

In both of the processes (A) and (B), a catalyst can be added in order to reduce the reaction time. As the catalyst, an alkaline catalyst or acidic catalyst is generally used. Examples of the alkaline catalyst include amines such as pyridine, pyrrole, triethylamine, diethylamine, dibutylamine and ammonia; phosphines such as tributyl phosphine and triphenyl phosphine. Examples of the acidic catalyst include metal alkoxides such as copper naphthenate, cobalt naphthenate, zinc naphthenate, 1,4-diazabicyclo[2.2.2]octane (DABCO), methylDABCO, tributoxyaluminum, trititanium tetrabutoxide and zirconium tertrabutoxide; Lewis acids such as trifluoroboron diethyletherate and aluminum chloride; tin compounds such as tin 2-ethylhexanoate, octyltin trilaurate, dibutyltin dilaurate and octyltin diacetate. The acidic catalyst is preferably the acidic catalyst, more preferably the tin compounds, especially octyltin trilaurate, dibutyltin dilaurate and octyltin diacetate. The catalyst is generally used in the amount of 0.01 to 5 weight part, preferably 0.1 to 1 weight part based on 100 weight parts of the polyisocyanate compound. The use of the catalyst in the amount of less than 0.01 weigh part scarcely brings about reduction of reaction time, whereas the use of the catalyst in the amount of more than 5 weigh part occasionally provides reduction of shelf stability of the resultant product.

In the preparation of the alkoxysilyl compound, as the polymerizable unsaturated compounds capable of reacting with the polyisocyanate compound by addition reaction to form urethane bond, the compounds having at least one active hydrogen in its molecule capable of reacting with a polyisocyanate compound by addition reaction to form urethane bond and at least one the polymerizable unsaturated group in its molecule can be used singly or in combination of two or more kinds.

As the polymerizable unsaturated compounds, carboxylic acid-containing polymerizable unsaturated compounds and hydroxyl group-containing polymerizable unsaturated compounds are generally employed. Examples of the carboxylic acid-containing polymerizable unsaturated compounds include unsaturated aliphatic carboxylic acids such as (meth)acrylic acid, itaconic acid, cinnamic acid, maleic acid, fumaric acid, 2-(meth)acryloxypropyl hexahydrophthalate and 2-(meth)acryloxyethyl hexahydrophthalate; unsaturated aromatic carboxylic acids such as 2-(meth)acryloxypropyl phthalate and 2-(meth)acryloxypropylethyl phthalate. Examples of the hydroxyl group-containing polymerizable unsaturated compounds include hydroxyl group-containing (meth)acrylates and hydroxyl group-containing styrenes such as 2-hydroxyethyl(meth)acrylate, 2-hydroxyropyl (meth)acrylate, 2-hydroxybutyl(meth)acrylate, 2-hydroxy-3-phenyloxypropyl(meth)acrylate, 1,4-butandiol mono (meth)acrylate, 2-hydroxyalkyl(meth)acryloyl phosphate, 4-hydroxycyclohexyl(meth)acrylate, neopentylglycol mono (meth)acrylate, poly(pentamethyleneoxycarboxylate)ethoxy (meth)acrylate, hydroxystyrene, hydroxy-α-methylstyrene, hydroxyethylstyrene, styrylether of polyethylene glycol having hydroxy at its end, styrylether of polypropylene glycol having hydroxy at its end, styrylether of polytetramethylene glycol having hydroxy at its end, (meth)acrylate of polyethylene glycol having hydroxy at its end, (meth)acrylate of polypropylene glycol having hydroxy at its end, (meth)acrylate of polytetraethylene glycol having hydroxy at its end, trimethylolpropane di(meth)acrylate, trimethylolpropane mono(meth)acrylate, EO modified trimethylolpropane tri(meth)acrylate, PO modified trimethylolpropane tri(meth)acrylate, pentaerythritol tri(meth)acrylate, pentaerythritol di(meth)acrylate, pentaerythritol mono (meth)acrylate, dipentaerythritol penta(meth)acrylate, dipentaerythritol tetra(meth)acrylate, dipentaerythritol tri (meth)acrylate, dipentaerythritol di(meth)acrylate and dipentaerythritol mono(meth)acrylate. Preferred are the aliphatic unsaturated carboxylic acids and the hydroxyl group-containing acrylates. Further, the hydroxyl group-containing acrylates are preferred, and the examples include 2-hydroxyethyl acrylate, 2-hydroxypropyl acrylate, pentaerythritol triacrylate and dipentaerythritol penta(meth)acrylate.

These polymerizable unsaturated compound is generally used in the amount corresponding to one or more equivalent of the active hydrogen based on one equivalent of the remaining isocyanate group of the intermediate obtained by addition reaction between the mercaptoalkoxy silane and the polyisocyanate compound. When the equivalent of polymerizable unsaturated comp is less than one equivalent, the active isocyanate group remains in the alkoxysilyl compound to occasionally generate bubbling, increase of viscosity and coloring by reaction with water. In the preparation of the alkoxysilyl compound, in order to improve plasticity and adhesion to substrate of the film, a divalent organic unit can be introduced between the alkoxysilyl group and the polymerizable unsaturated group by addition reaction with the polyisocyanate. As a precursor for forming the divalent organic unit, cyclic, linear (chain) or branched organic compounds having two or more active hydrogen atoms in its molecule undergoing the addition reaction with an isocyanate group can be employed. Examples of the groups having active hydrogen include a hydroxyl group, a carboxyl group, a mercapto group, an amino group, a sulfonic acid group, a phosphoric acid group and a silanol group. These organic compounds have generally two or more, preferably 2 to 10 of active hydrogen atoms, and especially two active hydrogen atoms. The compounds having the active hydrogen atoms have molecular weight of 50 to 100,000, preferably 100 to 50,000, especially 500 to 10,000. Examples of the compounds having two active hydrogen atoms include polyalkylene glycols, polyalkylene thioglycols, polyester diols, polyamindes, polycarbonate diols, polyalkylene diamines, polyalkylene dicarboxylic acids, polyalkylene diols and polyalkylene dimercaptans. Preferred are the polyalkylene glycols. Examples of the polyalkylene glycols which are commercially available include polyethylene glycol, polypropylene glycol, polytetraethylene glycol, polyhexamethylene glycol, and copolymer of two or more kinds of these polyalkylene glycol, and examples of trade names of the polyalkylene glycols include Unisafe DC1100, Unisafe DC1800 and Unisafe DCB1800 which are available from NOF Corp., PPTG4000, PPTG2000, PPTG1000, PTG2000, PTG3000, PTG650, PTGL2000 and PTGL1000 which are available from Hodogaya Chemical Co., Ltd., EXENOL1020 available from Asahi Glass Co., Ltd., and PBG3000, PBG2000, PBG1000 and Z3001 which are available from Dai-ichi Kogyo Seiyaku Co., Ltd.

As a process for the preparation of the polymerizable unsaturated group-containing alkoxysilane containing the divalent organic group, processes (C) and (D) using polyalkylene glycol are shown below.

Process (C):

Polyalkylene glycol is added to an adduct of mercaptoalkoxy silane to a polyisocyanate compound having an active isocyanate group at its end to form alkoxy silane having hydroxyl at one of its ends, and reacting this alkoxy silane with an adduct of mercaptoalkoxy silane to a polymerizable unsaturated compound having a hydroxyl group at its end (which is separately synthesized) to combine them through urethane bond.

Process (D):

An adduct of polyalkylene glycol-polyisocyanate compound to a polymerizable unsaturated compound having a hydroxyl group at its end is reacted with an adduct of mercaptoalkoxy silane to a polyisocyanate compound having an active isocyanate group at its end (which is separately synthesized) to combine them through urethane bond.

In the processes (C) and (D), the conditions for forming urethane bond are the same as in the above-mentioned process (A) or (B). A ratio of the compound having hydroxyl at its end to the compound having an active isocyanate group at its end is generally in the range of 1.0 to 1.2 by equivalent. In theses compounds are used in ratio of less than 1.0, the product is apt to color or increase the viscosity.

Further, in the preparation of the alkoxy silane compound, as a hydrolyzate of the polymerizable unsaturated group-containing alkoxy silane, a hydrolyzate of this alkoxysilane and other alkoxysilane can be used. The examples include tetramethoxysilane, tetraethoxysilane, tetrabutoxysilane, metyltrimethoxysilane, metyltriethoxysilane, dimetyldimethoxysilane and phenyltrimethoxysilane. In case the hydrolyzate is prepared, a ratio by equivalent of water to a total alkoxy group is generally in the range of 0.5 to 1.5. The preparation is carried out by stirring it in the presence or absence of solvent at temperature of 0° C. to boiling point of the component for 5 min. to 24 hours. Further, an acidic or alkaline catalyst may be used to reduce the reaction time.

As fine silica particles used in the preparation of the above-mentioned modified fine silica particles, those described previously can be used.

The amount of the alkoxy silane compound fixed on the fine silica particles is generally determined as a constant weight value of weight reduction % obtained by completely burning the dried particles in air. For example, the value is determined by thermogravimetric analysis from room temperature to 800° C. in air.

In the preparation of the modified fine silica particles, an amount of water that hydrolyzes at least one alkoxy group on a silicon atom in one molecule of the silane is enough for the amount of water consumed in hydrolysis of the alkoxysilane compound. The amount of water present and/or added in the hydrolysis preferably is at least ⅓ mole per one mole of alkoxy group on a silicon atom, especially ½ mole to 3 moles. In the product obtained by mixing the alkoxysilane compound having the formula (II) and fine silica particles under the condition containing no water, the alkoxysilane compound is physically adsorbed on a surface of the fine silica particle. Such mixing product only brings about reduced improvement of abrasion resistance.

In the preparation of the modified fine silica particles of the invention, the alkoxysilane compound of the formula (II) separately is subjected to a hydrolysis procedure to form a hydrolyzed compound, and then powders or colloidal silica of the fine silica particles is mixed with the resultant hydrolyzed compound, and subsequently heated and stirred. Otherwise, hydrolysis of the alkoxy silane compound of the formula (II) is carried out in the presence of the fine silica particles. Further, the fine silica particles are surface-treated in the presence of other components such as a polyfunctional unsaturated compound, a monofunctional unsaturated compound and a photopolymerization initiator. Of these preparations, it is preferred that the hydrolysis is carried out in the presence of the fine silica particles. The preparations are generally carried out at temperature of 20 to 150° C. for time period of 5 min. to 24 hours.

It is known that the fine silica particles contain moisture on surface thereof in the ordinary storage. For example, even colloidal silica dispersed in an organic solvent, i.e., an ordinary commercial product, also contains moisture of approx. 0.5%. Hence, in the preparation of the modified fine silica particles, it is also possible that the alkoxysilane compound is mixed with the fine silica particles, and heated under stirring to be hydrolyzed by utilizing the moisture.

When the fine silica particles in the form of a powder are employed in the preparation of the modified fine silica particles of the invention, an organic solvent compatible with water can be added in order to proceed smoothly and uniformly the reaction the silica powders and the alkoxysilane compound. Examples of the organic compound preferably include alcohols such as methanol, ethanol, isopropyl alcohol and butanol; ethers such as ethylene glycol monomethyl ether and ethylene glycol monobutyl ether; ketones such as acetone, methyl ethyl ketone and methyl isobutyl ketone; amides such as dimethyl formamide, dimethyl acetamide, N-methylpyrrolidone and γ-butyrolactone; and ethers. The solvent is added in an appropriate amount so as to conduct smoothly and uniformly the reaction.

Further, in order to promote the reaction in the preparation of the modified fine silica particles of the invention, acidic or alkaline catalyst may be added. Examples of the acidic catalyst include inorganic acids such as hydrochloric acid, nitric acid, sulfuric acid and phosphoric acid, organic acids such as methanesulfonic acid, toluenesulfonic acid, phthalic acid, malonic acid, formic acid, acetic acid and oxalic acid, unsaturated organic acids such as methacrylic acid, acrylic acid and itaconic acid, and ammonium salts such as tetramethylammonium hydrochloride and tetrabutylammonium hydrochloride. Examples of the alkaline catalysts include ammonia aqueous solution, primary or secondary or tertiary aliphatic amines such as diethylamine, triethylamine, dibutylamine and cyclohexylamine, organic amines such as pyridine, sodium hydroxide, sodium hydroxide, and ammonium hydroxides such as tetrabutylammonium hydroxide. Preferred are the organic acids and unsaturated organic acids as an acidic catalyst, and the tertiary aliphatic amines or ammonium hydroxides as alkaline catalyst. The acidic or alkaline catalyst is used in the amount of 0.001 to 1.0 part by weight, preferably 0.01 to 0.1 part by weight based on 100 parts by weight of the alkoxysilane compound.

A curable resin for forming a hard coat layer 4 containing fine particles of silica is generally an ultraviolet (UV) curable resin, in which known materials for UV curable resin such as polymerizable oligomers, polyfunctional monomers, monofunctional monomers, photopolymerization initiators and additives can be employed. As the fine particles of silica, the above-mentioned ordinary fine silica particles and/or the modified fine silica particles can be used.

As the UV (ultraviolet) curable resin, the materials shown in the previous description as to the formation of the hard coat layer can be generally employed. In more detail, examples of the materials for the UV curable resin include oligomers such as urethane oligomer, polyester oligomer and epoxy oligomer which have plural ethylenically double bonds; and mono- or polyfunctional monomers such as pentaerythritol tetraacrylate (PETA), pentaerythritol tetramethacrylate and dipentaerythritol hexaacrylate (DPEHA); and photoinitiators. As the mono- or polyfunctional monomers, those used in the preparation of the above modified fine silica particles can be appropriately used.

As described above, the UV curable resin is mainly composed of oligomers, mono- or polyfunctional monomers (reactive diluent) and photopolymerization initiators. Examples of the photopolymerization initiators include benzoin, benzophenone, benzoyl methyl ether, benzoin ethyl ether, benzoin isopropyl ether, benzoin isobutyl ether, dibenzyl, 5-nitroacenaphtene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone;

acetophenone, acetophenone benzketal, anthraquinone, 1-hydroxycyclohexylphenylketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hidroxy-2-methyl-1-phenylpropane-1-on, 1-(4-isopropylphenyl)-2-hidroxy-2-methylpropane-1-on, xanthone, 1,1-dimethoxydeoxybenzoin, 3,3'-dimethyl-4-methoxybenzophenone, thioxanthone compounds, diethylthioxanthone, 2-isopropylthioxanthone, 2-chlorothioxanthone, 1-(4-dodecylphenyl)-2-hydroxy-2-methylpropane-1-on, 2-methyl-1-[4-(methylthio)phenyl]-2-morphorino-propane-1-on, triphenylamine, 2,4,6-trimethylbenzoyldiphenylphsophineoxide, bis-(2,6-dimethoxybenzoyl)-2,4,4-trimethylpentylphosphinoxide, bisacylphosphinoxide, benzylmethylketal, 1-hydroxycyclohexylphenylketone, 2-hydroxycycloexylphenylketone, 2-hydroxy-2-methyl-1-phenylpropane-1-on, fluorenone, benzaldehyde, Michler's ketone, 2-benzyl-2- dimethylamino-1-(4-morphorinophenyl)-butane-1-on, 3-methylacetophenone, 3,3',4,4'-tetra(t-butylperoxycarbonyl)benzophenone (BTTB), further a combination of BTTB and dye sensitizer (e.g., xanthene, thioxanthene, cumarin). Preferred are benzylmethylketal, 1-hydroxycyclohexylphenylketone, 2,4,6-trimethylbenzoyldiphenylphsophineoxide, bis-(2,6-dimethoxybenzoyl)-2,4,4-trimethylpentylphosphinoxide, and 2-benzyl-2-dimethylamino-1-(4-morphorinophenyl)-butane-1-on.

The polymerizable oligomers, polyfunctional monomers, monofunctional monomers and photopolymerization initiators can be each used singly, or in combination of two or more kinds. The content of the diluent (polyfunctional monomers and monofunctional monomers) is preferably in an amount of 0.1 to 10 parts by weight, particularly 0.5 to 5 parts by weight based on 100 parts by weight of UV curable resin. The content of the photopolymerization initiator is preferably in an amount of not more than 5 parts by weight based on 100 parts by weight of UV curable resin. The above-mentioned examples of photopolymerization initiator can be naturally used in the formation of the hard coat layer having no silica particles.

The UV curable resin of the invention can further contain silicone polymer, preferably a graft copolymer having a side chain of silicone, especially an acrylic graft copolymer having a side chain of silicone. The silicone graft copolymer is generally prepared by polymerizing the acrylate modified silicone monomer and radical-polymerizable monomer. The acrylate modified silicone monomer is, for example, obtained by condensing a silicone of formula (III) and an acrylic silane compound of formula (IV):

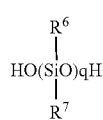

(III)

In the formula (III), $R^6$ and $R^7$ represent a monovalent aliphatic hydrocarbon group of 1 to 10 carbon atoms, phenyl or a monovalent halogenated hydrocarbon group, and q is an integer of not less than 1.

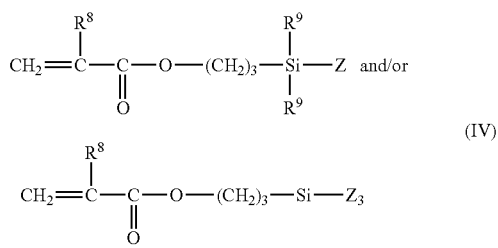

In the formula (IV), $R^8$ represents hydrogen or methyl, $R^9$ represents methyl, ethyl or phenyl, two $R^9$s are the same as or different from each other, and Z represents chlorine, methoxy or ethoxy.

The silicone of the formula (III) can be commercially available, and appropriately used according to the purpose. $R^6$ and $R^7$ of the formula (III) are a monovalent aliphatic hydrocarbon group of 1 to 10 carbon atoms, phenyl or a monovalent halogenated hydrocarbon group, and the monovalent aliphatic hydrocarbon group preferably is methyl, ethyl or acyl, and the monovalent halogenated hydrocarbon group preferably is 3,3,3-trifluoropropyl, 4,4,4-trifluoro-3,3-difluorobutyl or 2-chloroethyl. $R^8$ and $R^9$ especially are methyl.

As mentioned above, q of the formula (III) is an integer of not less than 1. An oily silicone graft copolymer is apt to be obtained by copolymerization of the acrylate modified silicone monomer derived from a high molecular weight-silicone having q of 100 or more and the radical-polymerizable monomer, whereas an oily, jellied or solid silicone graft copolymer is apt to be obtained by copolymerization of the acrylate modified silicone monomer derived from a low molecular weight-silicone having q of 100 or less and the radical-polymerizable monomer.

Examples of the acrylic silane compound of the formula (IV) include γ-methacryloxypropyldimethylchlorosilane, γ-methacryloxypropyldimethylethoxysilane, γ-methacryloxypropyldiphenylchlorosilane, γ-acryloxypropyldimethylchlorosilane, γ-methacryloxypropyltriethoxysilane and γ-methacryloxypropyltrichlorosilane. These acrylic silane compounds can be easily obtained by reacting a silicon compound with a compound having aliphatic multi-bond in the presence of chloroplatinic acid according to a method described in JP33-9969.

The radical copolymerization of the acrylate modified silicone monomer and the radical-polymerizable monomer can be prepared by know methods such as a radiation irradiation method and a method using a radical polymerization initiator. Further, in case the copolymerization is conducted by ultraviolet rays irradiation method, known sensitizer is used instead of the polymerization initiator. However, in case the copolymerization is conducted by electron beam irradiation method, the polymerization initiator need not be used. The resultant silicone copolymer is a comb-shaped graft copolymer having a trunk derived from the radical polymerizable monomer and a branch of silicone.

Examples of trade names of the silicone copolymer include Saimac US-150, US-270, US-350 and Rezeda GP-700, which are available from Toagosei Co., Ltd.

In the invention, various additives can be added if necessary. Examples of these additives include antioxidants, UV-absorbesr, light stabilizers, silane coupling agents, aging inhibitors, thermopolymerizarion inhibitors, coloring agents, leveling agents, surfactants, shelf stabilizers, plasticizers, lubricants, solvents, inorganic fillers, organic fillers and surface improvers.

Though the hard coat layer containing fine particles of silica according to the invention is composed of the above-mentioned materials, it is possible to form the fine silica particles-containing hard coat layer by adding the fine silica particles to the compositions of the previously mentioned hard coat layers having various functions such as the high scratch-resistant hard coat layer having further enhanced scratch-resistance, the fog-resistant hard coat layer having fog-resistance, the conductive hard coat layer having conductivity, the antistatic hard coat layer having antistatic properties, the high-gloss hard coat layer having more high gloss, the solvent-resistant hard coat layer especially improved in solvent resistance and the low permeable hard coat layer having low permeability into which moisture scarcely permeates. Further, the fine silica particles-containing hard coat layer can be formed on or under the ordinary hard coat layer or the functional hard coat layer.

The thickness of the hard coat layer is preferably in the range of 0.1 to 20 μm, especially in the range of 1 to 15 μm, in both the cases of a single layer and the total of plural layers.

On the hard coat layer of the film-reinforced glass of the invention, an antireflection layer is preferably provided.

The antireflection layer has, for example, the following structures:

a) one layer composed of a high refractive index-transparent thin film;

b) a laminate of two layers in total composed of an intermediate refractive index-transparent thin film and a high refractive index-transparent thin film;

c) a laminate of three layers in total composed of an intermediate refractive index-transparent thin film, a low refractive index-transparent thin film and a high refractive index-transparent thin film;

d) a laminate of four layers in total composed of a high refractive index-transparent thin film, a low refractive index-transparent thin film, a high refractive index-transparent thin film and a low refractive index-transparent thin film;

e) a laminate of five layers in total composed of a high refractive index-transparent thin film, a low refractive index-transparent thin film, a high refractive index-transparent thin film, a low refractive index-transparent thin film and a high refractive index-transparent thin film.

Examples of materials of the above intermediate or high refractive index-transparent thin film include ITO (Indium Tin Oxide), ZnO, Al-doped ZnO, $TiO_2$, $SnO_2$, and ZrO whose films have refractive index of 1.8 or more.

Examples of materials of the above intermediate or low refractive index-transparent thin film include $SiO_2$, $MgF_2$, $Al_2O_3$, acrylic resin, urethane resin, silicone resin and fluorine resin whose films have refractive index of 1.6 or less.

The thicknesses of the low, intermediate and high refractive index-transparent thin films are appropriately determined depending upon the constitutions and kinds of films and central wavelength so as to lower the reflection index in a visible ray region by interference of light.

The transparent thin films can be formed by metallizing (vapor deposition), sputtering, ion plating, CVD, microgravure coating, direct-gravure coating, or slot-die coating.

Further, the antireflection layer is preferably composed of a high refractive index-transparent conductive film formed on the hard coat layer and a low refractive index-transparent film provided on the high refractive index-transparent conductive film, the high refractive index-transparent conductive film comprising a ITO film of thickness of 100 to 600 Å and the low refractive index-transparent thin film comprising a $SiO_2$ film of thickness of 900 to 1,500 Å.

Since such the antireflection layer is a two layered structure consisting of the high refractive index-transparent conductive film and the low refractive index-transparent film, it has good antireflection properties compared with a single layered antireflection layer and can be formed easily and at low price as compared with the multi-layered antireflection layer, and further it has antistatic properties in addition to the antireflection properties because of its high refractive index-transparent conductive film.

As described above, in case the two-layered antireflection layer composed of the high refractive index-transparent conductive ITO film and the low refractive index-transparent $SiO_2$ film is formed, ITO film of less than 100 Å does not show sufficient antistatic properties whereas ITO film of more than 600 Å does not satisfy in cost, and further the ITO film of less than 100 Å and more than 600 Å does not show good antireflection properties in the combination of the transparent $SiO_2$ film of 900 to 1,500 Å.

Further, the transparent $SiO_2$ film of thickness of less than 900 and more than 1,500 Å does not show good antireflection properties in the combination of the ITO film of 100 to 600 Å.

The ITO film and the $SiO_2$ film can be formed by metallizing (vapor deposition), sputtering, ion plating or CVD.

In case the antireflection layer is formed on the hard coat layer of the invention, three layered laminated film consisting of the organic polymer film, the hard coat layer and the antireflection layer preferably has light transmittance of 40% or less at wavelength of 365 nm.

By setting the light transmittance at wavelength of 365 nm to 40% or less, the film-reinforced glass of the invention shows excellent weatherability and durability due to slight influence of environment such as ultra-violet rays, and consequently prevents yellowing and peeling film.

The three layered laminated film has, for example, the following structures:

(1) provision of an ultraviolet rays-screening layer between the organic polymer film and the hard coat layer;

(2) addition of an ultraviolet rays-screening function to the hard coat layer;

(3) addition of an ultraviolet rays-screening function to the antireflection layer.

The less the light transmittance of laminated film at 365 nm, the more preferable. In the invention, the light transmittance of laminated film at 365 nm preferably is 30% or less, and the light transmittance of laminated film at 365 more preferably is 20% or less, further preferably 10% or less, especially 5% or less.

In case the ultraviolet rays-screening layer is formed as mentioned in the above (1), the ultraviolet rays-screening layer can be formed by coating appropriate materials containing a resin such as an acrylic resin, urethane resin, silicone resin or epoxy resin and UV-absorber (an amount of 0.05 to 10% by weight) on a base film. The resultant ultraviolet rays-screening layer preferably has a thickness of 0.5 to 20 μm.

In case an ultraviolet rays-screening function is added to the hard coat layer as mentioned the above (2), such a ultraviolet rays-screening hard coat layer can be formed by coating appropriate materials (e.g., UV-curable resin) for forming the hard coat layer containing UV-absorber (an amount of 0.05 to 10% by weight).

In order to add an ultraviolet rays-screening function to the antireflection layer as mentioned the above (3), it is preferred that as materials for the high refractive index-transparent thin film, materials having high light transmittance at wavelengths in the vicinity of 400 nm and high absorpitivity at wavelengths of approx. 350 nm or less. Examples of the materials include ITO, ZnO.

A transparent conductive layer comprising metal and/or metal oxide may be provided on the glass plate 1.

The film-reinforced glass prepared as above has excellent impact resistance and penetration resistance and is effective in prevention of crimes, and further is light and thin. Therefore the film-reinforced glass can be employed for the following glasses: an inserted glass, a side window (door glass) and a rear glass in an automobile; a door glass of a door leaf for passenger to go in or out, a door glass for chamber, and a window glass in a railway vehicle (e.g., corridor train, express train, special train, sleeping car), a window glass and a door glass in constructions such as building, a showcase for display, and a glass of show window. The film-reinforced glass is preferably employed as a side window, inserted glass for side window and rear glass in an automobile, and a window glass in a railway vehicle, especially as a side window and inserted glass for a door glass in an automobile.

EXAMPLE

The first and second inventions according to the invention are illustrated in detail using the following Examples.

Example 1

As a glass plate, an organic polymer film, a PVB film, an EVA film and a PVB/EVA film, the following materials were employed.

Glass plate: silicate glass plate having a thickness of 5 mm washed and dried in advance;

Organic polymer film: PET film of thickness of 100 μm

PVB film: film obtained by forming a film of a thickness of 380 μm using the following formulation of PVB resin composition;
(Formulation of PVB resin composition)

| | |
|---|---|
| PVB (acetalated degree: 66 molar %) | 100 weight parts |
| Plasticizer (triethylene glycol di(2-ethylbutylate) | 40 weight parts |
| Adhesion adjustor (potassium acetate) | 0.1 weight parts |

EVA film: film obtained by forming a film of a thickness of 380 μm using the following formulation of EVA resin composition;
(Formulation of EVA resin composition)

| | |
|---|---|
| EVA (content of vinyl acetate: 26 wt. %) | 100 weight parts |
| Crosslinker (1,1-bis(t-butylperoxy)-3,3,5-trimethyl-cyclohexane) | 2.0 weight parts |
| Silane coupling agent (γ-methacryloxypropyl trimethoxy silane) | 0.5 weight part |
| Crosslinking auxiliary (triallyl isocyanurate) | 2.0 weight parts |
| UV-absorber (2-hydroxy-4-octylbenzophenone) | 0.15 weight part |

PVB/EVA film: film obtained by coating the formulation of EVA resin composition on the above-mentioned PVB film and drying the coated layer, to form a two layered film which has the PVB resin film of thickness of 380 μm and the EVA resin film of thickness of 200 μm.

<Preparation of a Film-Reinforced Glass>

The PVB/EVA film and the PET film were superposed on a glass plate having thickness of 5 mm, and the glass having the films was put into a rubber case to be degassed in a vacuum and then preliminary bonded at 110° C. under pressure. The glass bonded to the films was introduced into an oven and pressed at 150° C. for 30 minutes to prepare a film-reinforced glass (shown in FIG. 2) of the first invention.

<Evaluation on a Film-Reinforced Glass>

The resultant film-reinforced glass was evaluated using the following methods as to adhesion, impact resistance and penetration resistance. The obtained results are shown in Table 1.

(Adhesion)

Peel test as to whether the PET film was peeled off or not was carried out according to JIS K 6854. The values in the Table 1 show peeling strength. The mark "x" shows poor adhesion.

(Impact Resistance)

Test as to whether the film-reinforced glass is broken or not by applying impact to a surface of the glass was carried out according to JIS K 3211. The mark "◯" shows that the glass was not broken, and the mark "X" shows that the glass was broken.

(Penetration Resistance)

Test as to whether the film-reinforced glass is passed through or not by applying impact to a surface of the glass was carried out according to JIS K 3211. The mark "◯" shows that the glass was not passed through and the mark "x" shows that the glass was passed through.

Comparison Example 1

The procedures of Example 1 were carried out except for using a PVB resin film instead of the PVB/EVA film to prepare a film-reinforced glass. The resultant film-reinforced glass was evaluated as the same manner as above as to adhesion. The obtained results are shown in Table 1.

Comparison Example 2

The procedures of Example 1 were carried out except for using an EVA resin film instead of the PVB/EVA film to prepare a film-reinforced glass. The resultant film-reinforced glass was evaluated as the same manner as above as to adhesion, impact resistance and penetration resistance. The obtained results are shown in Table 1.

TABLE 1

| Example | Adhesion layer | Adhesion (N/cm) | Impact resistance | Penetration resistance |
|---|---|---|---|---|
| Example 1 | PVB/EVA | 40 | ◯ | ◯ |
| Com. Ex. 1 | PVB | X | — | — |
| Com. Ex. 2 | EVA | 40 | ◯ | X |

The results in FIG. 1 apparently show that the film-reinforced glass of the invention (Example 1) is excellent in adhesion, impact resistance and penetration resistance.

Example 2

As a glass plate, an organic polymer film, a PVB film, an EVA film and a PVB/EVA film, the following materials were employed.

Glass plate: silicate glass plate having a thickness of 5 mm washed and dried in advance;

Organic polymer film: PET film of thickness of 100 μm

PVB film: film obtained by forming a film of a thickness of 380 μm using the following formulation of PVB resin composition;

(Formulation of PVB resin composition)

| | |
|---|---|
| PVB (acetalated degree: 66 molar %) | 100 weight parts |
| Plasticizer (triethylene glycol di(2-ethylbutylate) | 40 weight parts |
| Adhesion adjustor (potassium acetate) | 0.1 weight parts |

EVA film & PVB/EVA film: film obtained by coating the following formulation of EVA resin composition on the above-mentioned PVB film and drying the coated layer, to form a EVA layer of thickness of 5 μm whereby a two layered film of the PVB resin film and the EVA resin film;

(Formulation of EVA resin composition)

| | |
|---|---|
| EVA (content of vinyl acetate: 26 wt. %) | 100 weight parts |
| Crosslinker (benzoyl peroxide) | 4.0 weight parts |

-continued

| (Formulation of EVA resin composition) | |
| --- | --- |
| Epoxy compound (glycidyl methacrylate) | 4.0 weight part |
| Silane coupling agent | 1.0 weight part |
| Toluene | 400 weight parts |

<Preparation of a Film-Reinforced Glass>

The PVB/EVA film and the PET film were superposed on a glass plate having thickness of 5 mm, and the glass having the films was put into a rubber case to be degassed in a vacuum and then preliminary bonded at 110° C. under pressure. The glass bonded to the films was introduced into an oven and pressed at 150° C. for 30 minutes to prepare a film-reinforced glass (shown in FIG. 2) of the first invention.

<Evaluation on a Film-Reinforced Glass>

The resultant film-reinforced glass was evaluated as the same manner as in Example 1 as to adhesion, impact resistance and penetration resistance. The film-reinforced glass of the invention (Example 2) was excellent in adhesion, impact resistance and penetration resistance.

Further the third and forth inventions according to the invention are illustrated in detail using the following Examples, i.e., Examples 3 to 14 and Comparison Examples 3 to 7.

<Preparation of Colloidal Silica Having Polymerizable Unsaturated Group>

To a solution including 7.8 weight parts of mercaptopropyltrimethoxy silane and 0.2 weight parts of dibutyltin laurate, 20.6 weight parts of isophorone diisocyanate was added dropwise in atmosphere of dried air under stirring at 50° C. for one hour, and thereafter stirred at 60° C. for three hours. To the resultant reaction mixture, 71.4 weight parts of pentaerythritol triacrylate was added dropwise at 30° C. for one hour, and thereafter stirred at 60° C. for three hours under heating to form an alkoxysilane compound.

A mixture consisting of 8.1 weight parts of the resultant silane compound A, 90.5 weight parts of methanol silica sol MEK-ST [colloidal silica dispersed in methyl ethyl ketone (mean particle size: 10 to 20 nm; silica concentration: 30%), available from Nissan Chemical Industries, Ltd.] and 0.1 weight part of ion-exchanged water was stirred at 60° C. for three hour, and thereafter 1.3 weight part of methyl ester of orthoformic acid was added to the mixture, which was stirred at the same temperature for one hour under heating to form a colloidal silica having polymerizable unsaturated group (dispersion A, silica concentration: 27%).

Examples 3 to 6 and Comparison Examples 3 and 4

<Preparation of a Glass for Automobile>

<Preparation of UV-Curable Resin (Coating Liquid)>

A mixture consisting of 33 weight parts of the resultant dispersion A, 15 weight parts of dipentaerythritol hexaacrylate (DPHA) and 2 weight parts of 1-hydroxycyclohexyl phenyl ketone (HCHPK) was stirred at room temperature for 30 minutes to prepare the UV-curable resin coating liquid. Similarly coating liquids shown in FIG. 2 were prepared <Preparation of Laminate>

The UV-curable resin coating liquid was coated on the a PET film (thickness: 122 μm; A-4000, available from Teijin LTD) using a wire bar-coater No. 10, and dried at 60 for five minutes, and then the coated layer was exposed to UV rays using a high pressure mercury lamp (0.5 J/cm$^2$) at atmosphere of air to form a hard cot layer of thickness of 5 μm.

On the resultant hard coat layer, an ITO layer of thickness of 250 Å and an SiO$_2$ layer of thickness of 1,200 Å were formed by a reactive spattering method to provide a two-layered antireflection layer.

Hence, a PET film having a hard coat layer and antireflection layer was obtained.

Subsequently, on a glass plate having thickness of 5 mm, which had been beforehand washed and dried, an EVA organic resin film (thickness of 200 μm) containing 1% by weight of 2,5-dimethyl-2,5-di(t-butylperoxy)hexane-3-di-t-butylperoxide and the resultant PET film (thickness of 122 μm) were superposed, and a releasable sheet of PET was superposed on the antireflection layer.

The glass having the films was put into a rubber case to be degassed in a vacuum and then preliminary bonded at 80° C. under pressure. The glass bonded to the films was introduced into an oven and pressed at 150° C. for 30 minutes to prepare a film-reinforced glass.

The composition of the hard coat layer and performances of the glass are shown in Table 2.

TABLE 2

| Example | Ex. 3 | Ex. 4 | Ex. 5 | Co. Ex. 3 | Co. Ex. 4 |
| --- | --- | --- | --- | --- | --- |
| DPHA | 15 | — | 15 | 15 | — |
| PTA | — | 15 | — | — | 15 |
| Dispersion A | — | — | 66 | — | — |
| Silica (MEK-ST) | 60 | 60 | — | — | — |
| HCHPK | 2 | 2 | 2 | 2 | 2 |
| MEK | 23 | 17 | 23 | 60 | 60 |
| Antireflection layer | Provided | Provided | Provided | Not provided | Provided |
| Wear resistance | ○ | ○ | ◎ | X | X |
| Abrasion resistance | ○ | ○ | ◎ | X | X |
| Antireflection property | ○ | ○ | ○ | X | ○ |

Note)
PTA: Pentaerythritol triacrylate
MEK: Methyl ethyl ketone

<Evaluation on a Film-Reinforced Glass>

(1) Wear resistance was evaluated by subjecting a surface of the antireflection layer side to Taber test (Truck wheel: CS-10F, Load: 500 g, Number of times: 1,000) using a Taber machine according to JIS R 3221, and then measuring haze values after the test. The mark "○" represents haze value of less than 10, the mark "◎" represents especially low value, and the mark "x" represents haze value of 10 or more.

(2) Abrasion resistance was evaluated by placing a steel wool #0000 on a surface of the antireflection layer side and applying a load of 200 g/cm$^2$ onto the steel wool and moving the steel wool back and forth ten times (10 reciprocations). The mark "◎" represents occurrence of no scratch, the mark "○" represents occurrence of slight scratch and the mark "x" represents occurrence of distinct scratch.

(3) Antireflection property was evaluated by representing the case dazzling eyes by the mark "x" and the case not dazzling eyes by the mark "○".

(4) Further, the film-reinforced glasses obtained in Examples showed a high transparency and no optical distortion, and further were excellent in impact resistance, penetration resistance and abrasion resistance. A process for the preparation of the glass for automobile described in Examples can be utilized for the preparation of glass constructions having the same structure as the glass, such as a window glass of a railway vehicle.

Examples 6 to 8

<Preparation of a Film-Reinforced Glass>

Examples 6 to 8 prepared the film-reinforced glass using the materials of Examples 3 to 5 respectively.

On the glass plate having thickness of 5 mm, an EVA organic resin film (thickness: 122 μm; A-4000, available from Teijin LTD) containing 1% by weight of benzoin ethyl ether instead of 2,5-dimethyl-2,5-di(t-butylperoxy)hexane-3-di-t-butylperoxide and the PET film (thickness of 122 μm) were superposed, and on the PET film, the previously-mentioned UV-curable resin coating liquid was coated using a roll coater and then a releasable sheet of PET was superposed on the coated layer.

The glass having the films was put into a rubber case to be degassed in a vacuum and then preliminary bonded at 80° C. under pressure. Subsequently, the coated layer was exposed to UV rays using a high-pressure mercury lamp of 1 kW/cm (exposing distance: 20 cm; exposed time: 30 seconds) to form a hard cot layer with crosslinking the transparent adhesion layer.

On the resultant hard coat layer, an ITO layer of thickness of 250 Å and an $SiO_2$ layer of thickness of 1,200 Å were formed in this order by a reactive spattering method to provide a two-layered antireflection layer.

Hence, film-reinforced glasses were obtained.

<Evaluation on a Film-Reinforced Glass>

The resultant film-reinforced glasses showed results similar to those described in FIG. 2. Further, the preparations in Examples 6 to 8 can be more easily carried out to improve the productivity.

Examples 9 to 11 and Comparison Examples 5 to 7

<Preparation of a Side Window for Automobile>

<Preparation of UV-Curable Resin (Coating Liquid)>

A mixture consisting of 33 weight parts of the above-described dispersion A, 15 weight parts of dipentaerythritol hexaacrylate (DPHA) and 2 weight parts of 1-hydroxycyclohexyl phenyl ketone (HCHPK) was stirred at room temperature for 30 minutes to prepare the UV-curable resin coating liquid. Similarly coating liquids shown in FIG. 3 were prepared.

<Preparation of Laminate>

The UV-curable resin coating liquid was coated on the a PET film (thickness: 122 μm; A-4000, available from Teijin LTD) using a wire bar-coater No. 10, and dried at 60° C. for five minutes, and then the coated layer was exposed to UV rays using a high pressure mercury lamp (0.5 J/cm²) at atmosphere of air to form a hard cot layer of thickness of 5 μm.

On the resultant hard coat layer, an ITO layer of thickness of 250 Å and an $SiO_2$ layer of thickness of 1,200 Å were formed in this order by a reactive spattering method to provide a two-layered antireflection layer.

Hence, a PET film having a hard coat layer and antireflection layer was obtained.

Separately, 95 weight parts of ethylene/vinyl acetate copolymer (content of vinyl acetate: 25 wt. %, Melt Index: 4), 5 weight parts of triallyl isocyanurate, 1 weight part of 1,1-bis(t-butylperoxy)-3,3,5-trimethylcyclohexane and γ-methacryloxypropyltrimethoxysilane were mixed by a roll mill heated to approx. 80° C. to prepare an EVAT composition. The composition was interposed between the PET films to prepare an EVAT composition sheet of thickness of 188 μm.

Subsequently, on the glass plate having thickness of 5 mm, which had been beforehand washed and dried, the resultant EVAT composition sheet were superposed, and a releasable sheet of PET was superposed on the antireflection layer.

The glass having the films was put into a rubber case to be degassed in a vacuum and then preliminary bonded at 80° C. under pressure. The glass bonded to the films was introduced into an oven and pressed at 150° C. for 30 minutes to prepare a film-reinforced glass.

The composition of the hard coat layer and performances of the glass are shown in Table 3.

TABLE 3

| Example | Ex. 9 | Co. 5 | Ex. 10 | Ex. 11 | Co. 6 | Co. 7 |
|---|---|---|---|---|---|---|
| DPHA | 15 | 15 | 15 | 15 | 15 | 15 |
| Dispersion A | — | — | 66 | 66 | — | — |
| Silica (MEK-ST) | 60 | 60 | — | — | — | — |
| HCHPK | 2 | 2 | 2 | 2 | 2 | 2 |
| MEK | 23 | 17 | 23 | 23 | 60 | 60 |
| EVA/TAIC (by wt.) of Adhesive layer | 95/5 | 100/0 | 95/5 | 97/3 | 95/5 | 95/5 |
| Antireflection layer | Provided | Provided | Provided | Provided | Not Provided | Provided |
| Wear resistance | ○ | ○ | ⊚ | ⊚ | X | X |
| Abrasion resistance | ○ | ○ | ⊚ | ⊚ | X | X |
| Antireflection property | ○ | ○ | ⊚ | ⊚ | X | ○ |
| Transparency | ⊚ | ○ | ⊚ | ⊚ | ○ | ○ |
| Adhesion | ⊚ | ○ | ⊚ | ⊚ | ⊚ | ⊚ |

Note)
PTA: Pentaerythritol triacrylate
MEK: Methyl ethyl ketone

<Evaluation on a Film-Reinforced Glass>

(1) Wear resistance was evaluated in the same manner as in Examples 3 to 6.

(2) Abrasion resistance was evaluated in the same manner as in Examples 3 to 6.

(3) Antireflection property was evaluated in the same manner as in Examples 3 to 6.

(4) Transparency was evaluated by subjecting the resultant film-reinforced glass to weatherometer test for 100 hours, and then measuring haze of the glass. The mark "○" represents haze value of less than 10, the mark "⊚" represents especially low value, and the mark "x" represents haze value of 10 or more.

(5) Adhesion was evaluated by subjecting the resultant film-reinforced glass to weatherometer test for 100 hours and then observing the extent of peeling and whitening between the film and the glass plate. The mark "⊚" represents no occurrence of peeling and whitening, the mark "○" represents the slight occurrence, and the mark "x" represents the distinct occurrence.

(6) Further, the film-reinforced glass obtained in Examples showed a high transparency and no optical distortion, and further was excellent in impact resistance, penetration resistance and abrasion resistance as well as antireflection property. The glasses for automobiles obtained in Examples can be advantageously used in side windows and rear window for an automobile.

Examples 12 to 14

<Preparation of a Film-Reinforced Glass>

Examples 12 to 14 prepared the film-reinforced glass using the materials of Examples 9 to 11 respectively.

On the glass plate having thickness of 5 mm, an EVA organic resin film (thickness: 122 μm; A-4000, available from Teijin LTD) containing 1% by weight of benzoin ethyl ether instead of 1,1-bis(t-butylperoxy)-3,3,5-trimethylcyclohexane and the PET film (thickness of 122 μm) were superposed, and on the PET film, the previously-mentioned UV-curable resin coating liquid was coated using a roll coater and then a releasable sheet of PET was superposed on the coated layer.

The glass having the films was put into a rubber case to be degassed in a vacuum and then preliminary bonded at 80° C. under pressure. Subsequently, the coated layer was exposed to UV rays using a high-pressure mercury lamp of 1 kW/cm (exposing distance: 20 cm; exposed time: 30 seconds) to form a hard cot layer with crosslinking the transparent adhesion layer.

On the resultant hard coat layer, an ITO layer of thickness of 250 Å and an $SiO_2$ layer of thickness of 1,200 Å were formed in this order by a reactive spattering method to provide a two-layered antireflection layer.

Hence, film-reinforced glasses were obtained.

<Evaluation on a Film-Reinforced Glass>

The resultant film-reinforced glasses showed results similar to those described in FIG. 3. Further, the preparations in Examples 12 to 14 can be more easily carried out to improve the productivity.

The film-reinforced glass of the first invention (and the adhesive film of the second invention) is excellent in impact resistance, penetration resistance and prevention of crimes, and has a small thickness, and further can be easily prepared. Though the film-reinforced glass is thin, the glass has excellent impact resistance, and penetration resistance near to those of the laminated glass. Therefore, the film-reinforced glass can be used in an automobile, a railway vehicle, a building and a showcase.

Moreover, the film-reinforced glass of the third invention and one obtained by the process of the forth invention is thin, but the glass has excellent impact resistance and penetration resistance near to those of a laminated glass and can be more easily prepared. Hence, the film-reinforced glass can be used in an automobile, a railway vehicle, a building and a showcase.

The invention claimed is:

1. A film-reinforced glass comprising one glass plate and a film comprising an organic polymer which is superposed thereon through a transparent adhesive layer,
   wherein the transparent adhesive layer comprises a first transparent adhesive layer comprising polyvinyl butyral and a second transparent adhesive layer comprising ethylene-vinyl acetate copolymer cured by triallyl isocyanurate, the first transparent adhesive layer being directly bonded to the glass plate and the second transparent adhesive layer being directly bonded to the film.

2. The film-reinforced glass as defined in claim 1, wherein a thickness of the first transparent adhesive layer is in the range of 100 to 1,000 μm.

3. The film-reinforced glass as defined in claim 1, wherein the first transparent adhesive layer is formed by a coating method.

4. The film-reinforced glass as defined in claim 1, wherein a thickness of the second transparent adhesive layer is in the range of 5 to 600 μm.

5. The film-reinforced glass as defined in claim 1, wherein the second transparent adhesive layer is formed by a coating method.

6. The film-reinforced glass as defined in claim 1, wherein the ethylene-vinyl acetate copolymer of the second transparent adhesive layer contains vinyl acetate in an amount of 10 to 50% by weight.

7. The film-reinforced glass as defined in claim 1, wherein the transparent adhesive layer further contains γ-(methacryloxypropyl)trimethoxysilane.

8. The film-reinforced glass as defined in claim 1, wherein the organic polymer film is a polyethylene terephthalate film or a polycarbonate film.

9. The film-reinforced glass as defined in claim 1, wherein a hard coat layer is provided on the organic polymer film.

10. The film-reinforced glass as defined in claim 9, wherein the hard coat layer comprises a cured layer formed from a curable resin containing fine particles of silica.

11. The film-reinforced glass as defined in claim 9, wherein the hard coat layer comprises a cured layer formed from a curable resin containing fine particles of silica and the silica particles have a primary particle size of 1 to 200 nm.

12. The film-reinforced glass as defined in claim 9, wherein the hard coat layer comprises a cured layer formed from a curable resin containing fine particles of silica and the silica particles have a polymerizable unsaturated group.

13. The film-reinforced glass as defined in claim 9, wherein the hard coat layer comprises a cured layer formed from a curable resin containing fine particles of silica and the silica particles are obtained by reaction between silica particles and an alkoxy silane compound having a polymerizable unsaturated group.

14. The film-reinforced glass as defined in claim 9, wherein an antireflection layer is formed on the hard coat layer.

15. A side window of an automobile comprising the film-reinforced glass as defined in claim 1.

16. An automobile provided with the side window comprising the film-reinforced glass as defined in claim 1.

* * * * *